US010250073B2

(12) United States Patent
Ben Hanoch et al.

(10) Patent No.: US 10,250,073 B2
(45) Date of Patent: Apr. 2, 2019

(54) SYSTEM AND METHODS OF CENTRALLY MANAGING A WIRELESS POWER OUTLET FOR POWERING ELECTRICAL DEVICES

(71) Applicant: POWERMAT TECHNOLOGIES LTD., Neve Ilan (IL)

(72) Inventors: Rachel Ben Hanoch, Givat Schmuel (IL); Ian Podkamien, Petach Tikva (IL); Amit Kiesel, Jerusalem (IL); Amir Salhuv, Rehovot (IL); Yuval Koren, Rehovot (IL); Guy Raveh, Mataa (IL); Ami Oz, Azor (IL); Oola Greenwald, Mevasseret Zion (IL); Ilya Gluzman, Holon (IL); Elieser Mach, Rosh Tzurim (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 270 days.

(21) Appl. No.: 15/077,218

(22) Filed: Mar. 22, 2016

(65) Prior Publication Data
US 2016/0276873 A1 Sep. 22, 2016

Related U.S. Application Data

(60) Provisional application No. 62/136,536, filed on Mar. 22, 2015.

(51) Int. Cl.
*H02J 7/02* (2016.01)
*H02J 50/12* (2016.01)
*H02J 50/80* (2016.01)

(52) U.S. Cl.
CPC .............. *H02J 50/12* (2016.02); *H02J 7/025* (2013.01); *H02J 50/80* (2016.02)

(58) Field of Classification Search
CPC ............. H02J 50/12; H02J 50/80; H02J 7/025
USPC ........................................................ 307/104
See application file for complete search history.

(56) References Cited

U.S. PATENT DOCUMENTS

| 7,822,564 | B2 * | 10/2010 | Davis | ...................... | H04W 4/02 |
| | | | | | 702/60 |
| 9,467,808 | B2 * | 10/2016 | Davis | .................... | H04W 84/18 |
| 9,510,302 | B2 * | 11/2016 | Sawai | ................. | H04W 52/243 |
| 9,551,775 | B2 * | 1/2017 | Rangarajan | ............... | G01S 1/08 |

* cited by examiner

Primary Examiner — Dinh T Le
(74) Attorney, Agent, or Firm — William Dippert; Laurence Greenberg; Werner Stemer

(57) ABSTRACT

The disclosure relates to systems and methods for managing a wireless powering system for power transfer to electrical devices, providing central management console through a communication network. The wireless powering system comprising at least one wireless power outlet with an integrated communication module and at least one management server and is further operable is further operable to provide location based services when coupled with a software application. The management system, of the current disclosure, is enabling remote health check and maintenance of all of wireless power outlets within the network. Further, the management system allows for complete monitoring of a deployment according to system administrator rights and policy management coupled with command and control functioning to determine allowed/disallowed functionality while transferring powering to an electrical device in a specific venue.

16 Claims, 15 Drawing Sheets

SYSTEM AND METHODS OF CENTRALLY MANAGING A WIRELESS POWER OUTLET FOR POWERING ELECTRICAL DEVICES

CROSS-REFERENCE TO RELATED APPLICATION

This application is based upon and claims the benefit of the filing date of U.S. provisional application Ser. No. 61/136,536, filed Mar. 22, 2015, the disclosure of which is hereby incorporated in its entirety by reference herein.

FIELD OF THE INVENTION

The disclosure herein relates to systems and methods for managing a wireless power transfer network for electrical devices. In particular, the invention relates to a network based management system of portable wireless power transfer units. The system is operable to provide remote health check, maintenance and policy management along with command and control of the network elements.

BACKGROUND OF THE INVENTION

The spread of mobile devices such as mobile handsets, media players, tablet computers and laptops/notebooks/netbooks and ultra-books increases user demand for access to power points at which they may transfer power to charge mobile electrical devices while out and about or on the move.

Systems that conveniently provide the opportunity to transfer power for charging the electrical devices in public spaces, in which the user of a mobile electrical device may remain for extended periods of time, say more than a few minutes or so, require a complex management system. The management system may need to control public spaces that may include restaurants, coffee shops, airport lounges, trains, buses, taxis, sports stadia, auditoria, theatres, cinemas or the like. Further, there is a need for such systems to enable easy tracking of power transfer locations in public spaces as soon as the need arises, that is, when the battery level runs low, while power transfer locations around current location may answer user expectations.

Furthermore, in the field of managed wireless power systems, distributed at many different venues such as coffee shops, restaurants, railway stations, airports and the like, often there may be a need to determine the distinct location of the device within the venue. Using an indoor location enabler such as a Bluetooth beacon suffers from limited resolution, as the location resolution of such device is in the range of several feet. Further, in a venue with several charging spots installed, all within the range of a single location enabler (using Bluetooth, for example), the location of the device may be determined to the resolution of the location enabler. For various business models/business cases a more accurate location of the device may be desired to enable services such as ordering products (food, beverages, other) to that location, payment services based on location, and more.

Furthermore, even when using a plurality of location enablers, the intersection of location may provide a better location determination, but if the intersection is larger than a typical device, more than a single device may reside within the determined location.

There is a need for systems that conveniently manage wireless power transfer, including accurate location services combining location enablers and power transfer management system for providing a complete one box solution for power transfer in diversified locations with limited network infrastructure.

The invention below addresses the above-described needs.

SUMMARY OF THE INVENTION

According to one aspect of the disclosure a wireless power providing system is presented for to transferring wireless power to at least one electrical device associated with a wireless power receiver, the system comprising: at least one wireless power outlet, each wireless power outlet having a distinct outlet location within a venue of a common venue location and operable to transfer power to the at least one electrical device via the wireless power receiver; at least one homing-beacon, each of the homing-beacon being connectable with an associated wireless power outlet operable to provide location based services pertaining to the at least one wireless power outlet; at least one management server operable to managing wireless power transfer from the at least one wireless power outlet to the at least one electrical device; and a dedicated software application associated with each of the electrical devices and operable to communicate with the at least one management server; wherein the wireless power providing system is operable to control centrally each of the wireless power outlet via an associated communication module and further detect the distinct outlet location within the common venue location.

As appropriate, the at least one management server is further operable to execute instructions directed to: receiving a first identification code associated with each of the wireless power outlet.

As appropriate, the at least one management server is further operable to execute instructions directed to: receiving a second identification code from the dedicated software application; and providing the distinct outlet location using data stored in an associated data repository.

Variously, the at least one homing-beacon is using technology selected from a group consisting of a Near Field Communication (NFC), Radio-Frequency Identification (RFID), Bluetooth Low Energy, iBeacon, Wi-Fi and Global Positioning System (GPS) and the like as well as combinations thereof.

As appropriate, the at least one homing-beacon is operable to transmit a homing unique signal detectable by the dedicated software application and further communicate to the at least one management server.

The wireless power providing system may further comprise analyzing the homing unique signal using system's data repository to determine the distinct outlet location identified by comparing signal strength of associated wireless power outlets.

Optionally, each of the homing-beacon associated with the wireless power providing system is being characterized by one structural element selected from: the homing-beacon is attached into the associated wireless power outlet; and the homing-beacon is embedded into said associated wireless power outlet.

The at least one management server is further operable to execute instructions directed to: monitoring health of the at least one wireless power outlet; and providing remote maintenance of the at least one wireless power outlet.

Optionally, the wireless power providing system, wherein the managing wireless power transfer is determined by at least one power management policy associated with each of the wireless power outlet, the at least one power management policy determines power transfer conditions for the at least one wireless power outlet.

Optionally, the at least one power management policy is characterized as a default power management policy to determine default power transfer conditions.

Variously, the at least one power management policy being characterized by at least one data functionality selected from: data functionality pertaining to location identification; data functionality pertaining to user identification; data functionality pertaining to time duration of wireless power transfer; data functionality pertaining to real time management of power consumption; data functionality pertaining to real time management of battery health; data functionality pertaining to location traffic control; data functionality pertaining to historical usage; and data functionality pertaining to the level of current applied at power transfer from said at least one wireless power outlet.

Variously, the wireless power providing system, wherein the providing remote maintenance comprises performing a maintenance action selected from a group consisting of: starting each of the wireless power outlet; stopping each of the wireless power outlet; restarting each of the wireless power outlet; software updating for each of the wireless power outlet; controlling a visual user interface for each of the wireless power outlet; controlling a user audio interface for each of the wireless power outlet and combinations thereof.

As appropriate, the wireless power providing system, wherein the monitoring health comprises verifying that the at least one wireless power outlet is responding to a communication signal within a time-out limit.

As appropriate, the wireless power providing system, wherein the at least one power management policy is distributed in response to a change of the at least one power management policy on the at least one management server.

As appropriate, the wireless power providing system, wherein the at least one power management policy is distributed according to a distribution schedule.

As appropriate, the wireless power providing system, wherein the at least one power management policy is distributed upon a communication request from the at least one portable wireless power transfer unit.

According to another aspect of the disclosure, a method is taught for detecting at least one wireless power outlet associated with at least one venue, the method for use in a wireless power providing system, the system comprising: the at least one wireless power outlet operable to transfer power to at least one electrical device via a wireless power receiver; each of the wireless power outlet is having a distinct outlet location within a venue with a common venue location; at least one homing-beacon, each said homing-beacon is paired with an associated wireless power outlet operable to transmit at least one homing signal to a dedicated software application; at least one management server operable to manage wireless power transfer from the at least one wireless power outlet to the at least one electrical device; and the dedicated software application associated with each of the electrical device and operable to communicate with the at least one management server; the method for operating the wireless power providing system in an improved manner, the method comprising: scanning, by the dedicated software application, the at least one venue to identify the at least one wireless outlet; detecting, by the dedicated software application, at least one homing signal transmitted by the at least one homing-beacon; transmitting, by the dedicated software application, the at least one homing signal to the at least one management server; and receiving, by the dedicated software application, a detailed service report comprising at least one selectable wireless power outlet.

As appropriate, the step of scanning is configured to trigger a manual scanning or trigger an automatic scanning.

As appropriate, the at least one homing signal comprises a pre-defined unique token associated with each of the wireless power outlets, the at least one homing signal comprising: a message header; a set of signal properties; a device state; a unique identifier of the at least one homing-beacon; and a message tail.

Optionally, the device state is selected from a group consisting of: an idle state, a not-ready for service state, a ready for service state and a pending for service state.

As appropriate, wherein the detailed service report comprises a set of wireless power outlets and associated information, the device state for each of the wireless power outlet conforms with the ready for service state or the pending for service state.

As appropriate, wherein the at least one selectable wireless power outlet is automatically triggering wireless power transfer, if the detailed service report comprises one selectable wireless power outlet.

As appropriate, wherein the at least one selectable wireless power outlet is manually triggering wireless power transfer, if the detailed service report comprises at least two selectable devices.

As appropriate, the method further comprising filtering the detailed service report by the dedicated software application. Optionally, the step of filtering is using a signal measurement detection to remove a wireless power outlet characterized by: located at a distance less than a minimal threshold distance, located at a distance greater than a maximal threshold distance or instability.

It is noted that the management server may be implemented inside the power transmitter (Tx). One may want to configure the charging policy for his/her power transmitter to charge only his/her families devices. Additionally, one may want the power transmitter to have different behavior for one's wearables based on RxID or other messages.

Furthermore, with the Bluetooth 'mesh' option growing, it might be possible to have one power transmitter in the venue acting as the 'management server' and update the charging policies of the venue, rather than using a gateway to the external network.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1:
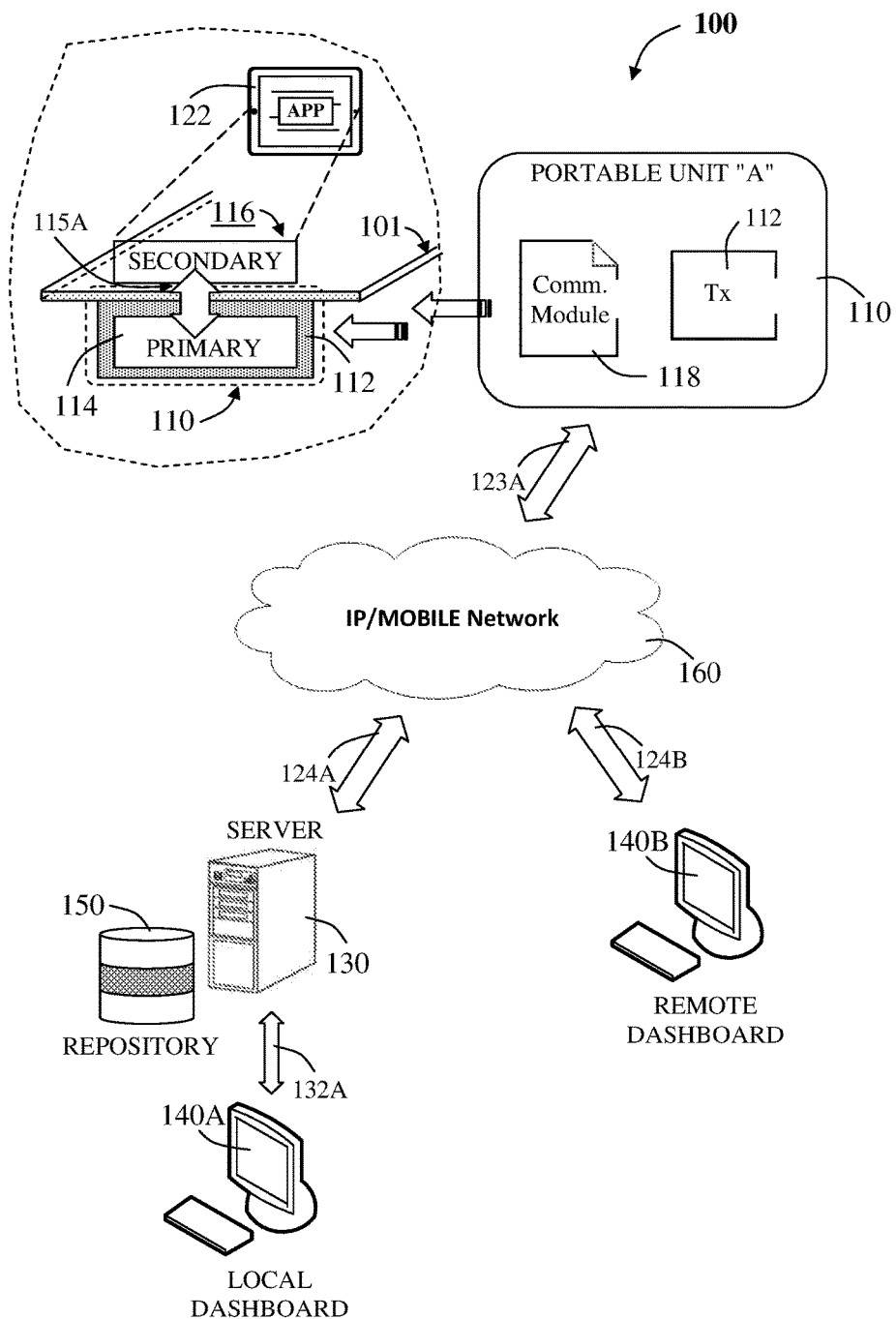
FIG. 1 is a schematic representation of selected elements of a distributed system for powering electrical devices via wireless power outlet and receivers manageable over the internet network, according to the presently disclosed subject matter.

Aspects of the present invention relate to providing systems and methods for managing a wireless power transfer network for electrical devices. The wireless powering system represents a centrally managed system, using a network based management console, in communication with a management server. The wireless powering system may execute power management software coupled with location based services using a software application installed on an electrical device associated with a wireless power receiver. The power management software provides a platform, centrally covering power management aspects of a network of wireless power transfer units distributed in public spaces, where each unit comprises a wireless power outlet and a communication module. Optionally, the communication module is incorporated into the wireless power transfer unit to provide external communication functionality, and specifically communication functionality with a remote management server. The power management software may provide the ability to manage the wireless power (charging spots—CS) that are installed in a location. Alternatively, the system may use an add-on communication module, provided by another vendor. The power management software is operable to provide remote control and monitoring, maintenance of portable wireless power transfer units and optionally coupled with system remote health checking, enable provisioning functionality, maintaining security and business goals using policy enforcement technique.

As appropriate, the system is further operable to operate various additional elements included with the system, such as room-temperature monitoring using Negative Temperature Coefficient (NTC) sensors, microphone if existing, Bluetooth beacon for monitoring movement of devices within the venue and more.

The management system of a portable wireless power transfer network may provide a set of functionalities such as network power distribution discovery identifying the portable power units present on a network or a location, availability and uptime, network power transfer unit monitoring to determine the health of network components, mapping of network elements, maintenance and event management, performance and usage data collector, management data browser and intelligent notifications allowing configurable alerts that will respond to specific power transfer network scenarios.

Accordingly, management server collection of data usage may contribute valuable statistics accessible to end users, partners, service providers, venue owners and the like.

Optionally, policies may be based upon historical usage analysis of a specific wireless power outlet, specific user or a specific group of users.

The power management and maintenance software may include operational aspects such as remote stop/start, remote restart, remote software upgrades and updates. Optionally, the remote maintenance functionality may include remote user indication control testing (LED, sound), notifications via Bluetooth to the target device display, network based connection with the application and more.

The power management software may enable remote health checks by performing a testing procedure of the software or hardware quality of the remote wireless outlet, or verifying the remote wireless power outlet is active by testing response to a communication signal. Optionally, the health procedure may test for "health" parameters, such as temperature, power consumption, connectivity status, current and the like. Further, the testing procedure may be a scheduled process or carried out on demand. Where appropriate, an indication alert may be triggered.

The power management software may enforce policies for command and control, these may include operational aspects such as power management policies to define who, when and where can charge and for how long, policies to define the type of service (current), policies to define type of device, dynamic policies optionally selected from a group consisting of real time management of power consumption, real time management of battery health, location traffic control in venue (send users to venues based on real time parameters values).

The power management software may include operational aspects of providing power transfer or control billing aspect associated with an electrical device. Thus, the power management software may be operable to provide features such as aborting power provision of a power transfer outlet, continue providing power, modifying the service or controlling one or more aspects of the power transfer procedure by enforcing a new policy, for example, or the like, possibly according to operating signals received. The power management software may further be operable to handle user accounts, registration of devices, user specific information, billing information, user credits and the like.

It is noted the management software may further be operable to detect undesirable conditions while coupling health checking functionality and remote maintenance. For example, events such as adding or removing a wireless power outlet in a venue, may be detected.

Optionally, the system may be configured that when a new wireless power outlet is detected, the system automatically responds in installing an appropriate policy.

Additionally or alternatively, the system may be configured to transmit an alert to the system administrator with an appropriate message.

The current disclosure further provides location based services to enable locating a wireless power outlet within a venue. The system may use a dedicated wireless transmitter, referred to hereinafter as a "homing-beacon" associated with the wireless power outlet, a management system operable to manage and control the various wireless power outlets located in the same/different venues and using a dedicated software power application executable on the electrical mobile device.

Alternatively, the system may be used from outside of a venue to notify users in need of power where they can find the nearest location. Further, the system may provide services within the venue, directing a tablet user to a wireless power outlet which may allow for more power, for example. Another possible service may support "crowd control" for detecting empty tables in a restaurant and the like.

The homing-beacon may use Bluetooth technology, RFID technology or similar technologies used with location enablers. Further, the homing-beacon may be operable to determine the common venue location, while the wireless power outlet may be operable to provide a distinct outlet location within the venue.

In one possible embodiment, the electrical device may be a smartphone, a tablet and the like operable to retrieve a common venue location (a 'macro location'), from the homing-beacon using Bluetooth technology, for example, representing the location of a store, coffee shop, a warehouse and the like. The retrieved location may be transmitted via the dedicated software application to the management system. Upon user request ('tapping' or another similar triggering action), the management system monitors the charging spots in its vicinity, attempting to start a power transfer session. When the management system finds a correlation between the triggering request and a specific wireless power outlet in the vicinity of the homing-beacon, the system may then determine a distinct location of the device to the range of the wireless power outlet active area.

It is noted that there may exist various software applications requiring indoor distinct location (micro-location) that may benefit from the information of the location retrieved via the wireless power management system, as an example, replacing common tablets per seat in a restaurant for various needs of placing an order, paying, and more.

Variously, different location enabling methods may be applied to reach improved accuracy. For example, using GPS technology may provide location based services accuracy of few 10th of meters. Using Wi-Fi location enabling method may provide improved accuracy, with the Bluetooth beacon providing better accuracy to sub-meters and the inductive power transfer system may provide accuracy to the last centimeter. Using several beacons, and crossing the location common to all, will improve the accuracy. Additionally, crossing between the different location enabling methods may further assist in determining the micro-location.

It is further noted that the current disclosure uses the knowledge of the location of a wireless power receiver associated with an electrical device and relative to a wireless power outlet (with known location) to determine a distinct location of the electrical device embedding the wireless power receiver. The actual location may be not limited by satellite reception (for GPS, for example), RF reflections and the like and thus may be used indoors, as well as outdoors. Further, the identified location is of high accuracy and with high resolution. Additionally, the information may be to improve or even calibrate location services of an electrical device.

Furthermore, the described embodiment hereinabove, using a wireless power management system is based on a typical business model, but is not limited to such an example. Moreover, even without such a management system, the proximity of the wireless power receiver to the wireless power outlet while in power transfer phase, determines a distinct location of the wireless power receiver relative to the wireless power outlet.

The Management Console

The system provides a management console communicating with the management server software application layer that may provide a manager of a premises with the ability to manage a wireless power transfer network that may be installed therein, directly or via the venue gateways. Such a wireless power transfer network may include portable wireless power units, non-portable wireless power units or combinations thereof. Optionally, a manager with higher administrative rights may control a larger portion of the organizational network of wireless power transfer. The management console may be accessed through a web browser or an application on a computer, laptop, tablet and the like.

The management console may allow a manager to perform various tasks of managing the power provisioning process, remote maintenance, system health check, system monitoring, policies management and the like. A manager, for example, may be capable of viewing real time on/off status of charging spots; remote software updating or restarting a portable wireless power transfer unit, viewing usage statistics and generate reports per user/location/charging spot/time; create, edit, and assign usage policies per location/day-of-week/time/user.

It is noted that the management system, possibly operable via the policies management, may provide "crowd control". A user with specific needs of charging power may be directed to a specific location in a venue, while another user with different power requirements may be directed to a different location. Thus, directing users to preferred locations according to power requirements may help to optimize the overall usage of the system.

By way of example, a first user device may be detected that could potentially use a 15 watt outlet is placed on an outlet which can supply only less, for example due to power supply issues, hardware issues or the like. A second user device may be concurrently detected that can only consume 5 watts but is using an outlet which could better serve the first user device with the 15 watt demand. In this example the management system may initiate a switch between the two users.

In another example, sensors within the outlets may measure additional parameters enabling users to be directed according to other preferences possibly unrelated to power provision. For example, a user may be directed to a warmer or colder environment, a better air quality environment, a non-smoking environment, a low pollen count environment or the like as suits the user's particular needs.

The system may provide three levels of access and administration: Administrator, MAdmin and MUser, for example.

Administrator-level managers may have administrative rights to access all the information and the settings in the system.

MAdmin-level managers have access to the general settings for all the locations of a specific premises or group of premises. The MAdmin can create/delete/edit MAdmin and MUser accounts and assign rights to them.

MUser-level managers may have rights to one or more locations, for which he can view statuses, manage specific policies and get reports.

It is noted that further administrative rights associated with additional system administrators may be configured to answer various venue needs, providing read only, read/write access, for example, as required.

In certain embodiments, the system may have a flat hierarchy of the MUsers, where MUsers cannot be defined as managers of other MUsers, and there is no inheritance of rights from one user to another in a hierarchical way. Alternatively, the MUsers may be arranged in hierarchical structures Each customer may start with one MAdmin account, which may then create other MAdmin and MUser accounts. When an Admin account is created, the following may be set: company, type of admin, full name, phone, email, rights to manage a certain list of locations, and the like.

All the activities that MAdmins and MUsers perform in the system may be logged in a system log (date/time, user, type of activity, details).

Figure 5A:
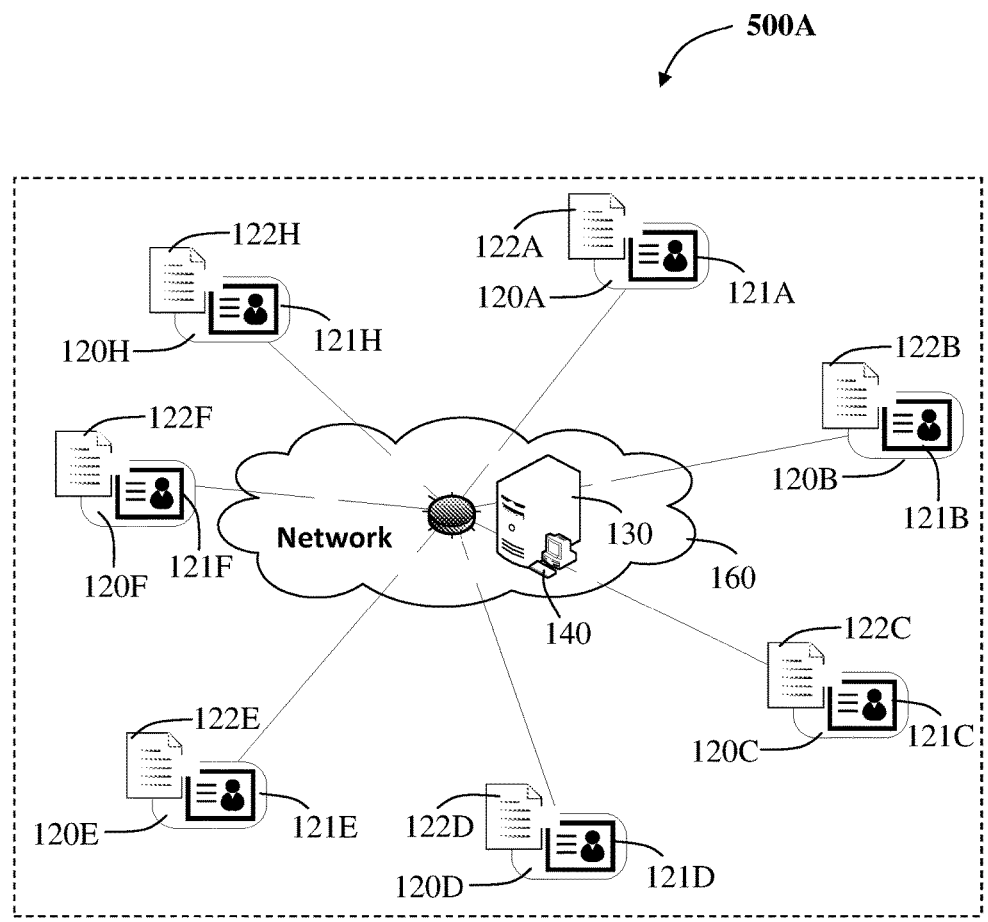
FIG. 5A is a schematic representation of possible view of a wireless powering system, accessible on a management console, enabling selection of a wireless power outlet for further actions, according to the presently disclosed subject matter.
Figure 5B:
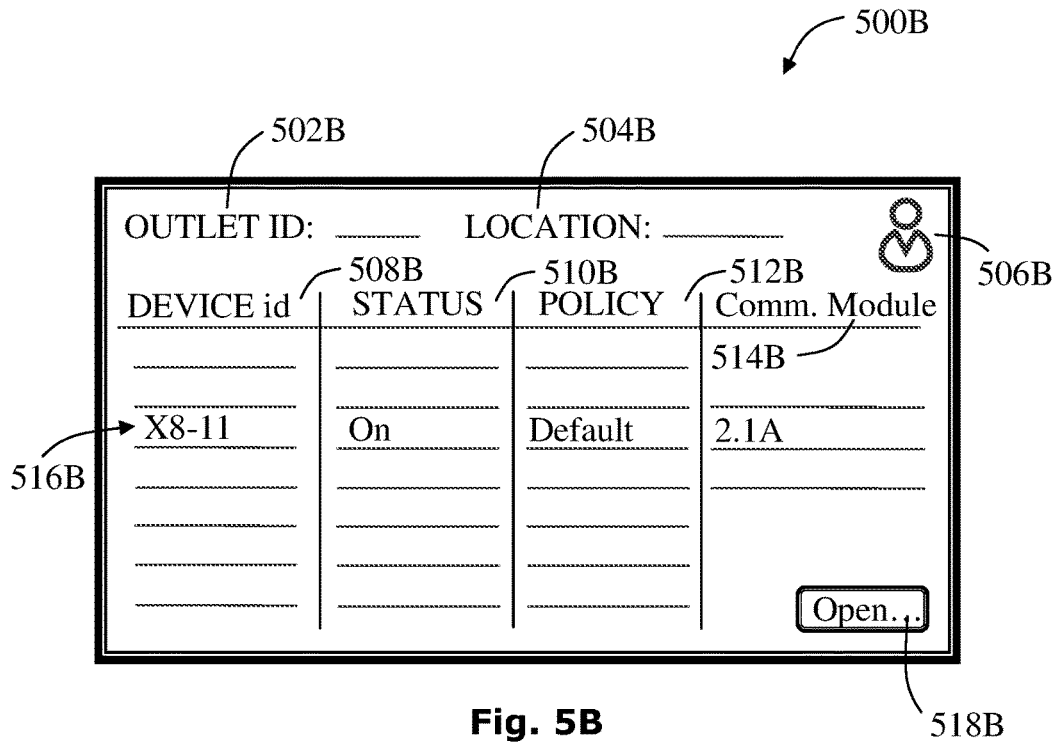
FIG. 5B is a schematic representation of a possible basic summary listing of a wireless power transfer unit's distribution, accessible on a management console, according to the presently disclosed subject matter.
Figure 5C:
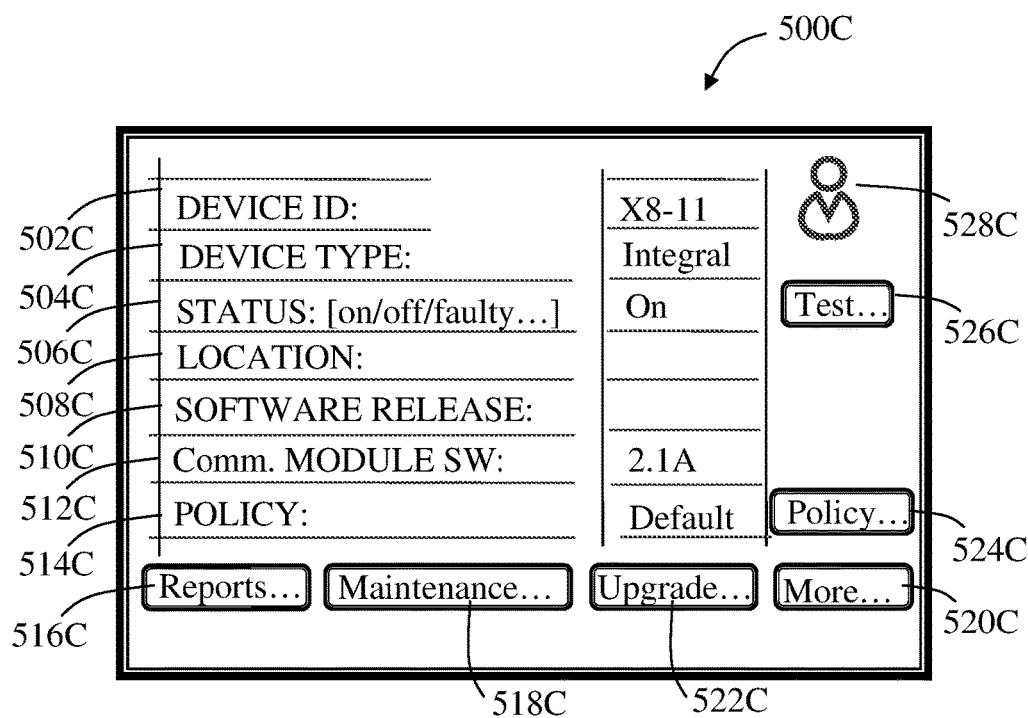
FIG. 5C is a schematic representation of a possible summary view of a portable wireless power transfer unit, accessible on a management console and optionally displayed when the transmitter unit is accessed, according to the presently disclosed subject matter.

The management console may allow a MAdmin or MUser to view a schematic diagram of the location of the charging spots in a venue such as described in FIG. 5C. The diagram may denote the status of the charging spots with color or pattern indications. The status may include On, Off, Note-Used-Recently, faulty, and the like. The management console may also be operable to display usage statistics per user/charging spot/time, in the form of, e.g., graphs on screen, formatted printable report, exportable CSV format and the like. Other possible reports include, e.g., charging patterns over time, list of charging spot used and number of usages per each over time, list of locations with user charged and/or number in visits over time, statistics of usage of each type of user plan. For the graphs the time scale may have a slider that enables adjustment of the time scale—from data points every 1 minute to data points every one week. It is possible to have a non-continuous scale, e.g. 1 minutes-15 minutes-1 hour-4 hours-1 day-1 week.

A MUser may set policies for the 'Store promotion' layer of service: Add free charging minutes on top of $T_{free}$, based on criteria. A user/user group that qualify may be allowed to charge their device for free, variously, for: a specified number of minutes; at specified locations; during specified days of the week; at specified time slots. A policy may have a validity duration, e.g., valid between Date1 and date2, where date1<=date2 and date2 can be equal to 'no expiration'.

An administrator of the server may have the access to perform one or more of the following actions in the system:

The Administrator (Admin) may be able to do everything that a MUser can do, and may have rights to all customer accounts and all locations.

The Admin may be able to overrule a policy for a specific device (by RxID) by overriding the base policies for that device. Such devices may be used at installation or at maintenance times to validate the proper operation of a charging spot. The policy override may be time limited and may revert back to previous default policy when the time is up. The Admin may have access to devices that are designated with 'always on' or 'never on' policies, which may be referred to as "Golden Receivers".

The administrator may have visibility into the wellbeing of the installed components, e.g., alerts for gateways that did not communicate with the server over a specified period of time, alerts for charging spots that did not communicate with the server over a specified period of time, and the like.

It is noted that a power provisioning software application may be installed on a mobile electrical device and may be operable for receiving data pertaining to a portable wireless power transfer network of a devices.

Further, the power provisioning software application may be operable to be executed on a mobile electrical device enabling to manage power requirements within a wireless power transfer network. The power transfer network system, may use a deployment of at least one wireless power outlet (in the public space) controlled via a management console and operable to manage wireless power transfer with the power receiver of a mobile electrical device, at least one management server in communication with the at least one wireless power outlet, and a database in communication with the management server and operable to store data received by the management server from the at least one wireless power outlet.

Where appropriate, the wireless power transfer system may allow wireless power transfer to electrical devices of users such as mobile devices, smartphones, tablet computers, laptops and the like, at home, office and various public areas, and may be centrally monitored and controlled.

It is noted that the portable wireless power transfer unit may be operable to execute a software module with near communication features to communicate with the electrical mobile device. Thus, the portable wireless power transfer unit may be operable to perform identification to verify user credentials and allowances, and further communicate with the management server. The management server may be operable to receive communication requests from the portable wireless power transfer unit comprising at least one data package to enable gathering of detailed user or device usage information, power status information and store the data in a database. The gathered data may include location and geographical information, user and device ID and other possible identification data, battery level information and the like.

It is noted that regarding the current disclosure, communicating externally with the charging spot may support firmware upgrade (or any required intervention inside the charging spot firmware, for this matter). Further, for out of band (OOB) communication may provide power regulation (such as DOC); power monitoring (such as extended signaling, consumed power report and the like); User stuff like ordering food, surfing the internet or any other "user oriented" application. In general, once the user has a data channel from the device to the management server, other issues may be communicated beyond power transfer.

As used herein, the term "virtual session" or "session" may refer to a hosted session of a virtual computing environment associated with a particular user that may be accessed from one or more client devices other than the host. For example, a session may include a thin client session, a virtual application session, a virtual machine session, a virtual operating system session, and/or the like. As used herein, a session described as being "between" a host device and a terminal device refers to the exchange of data between the host device and the terminal device, where the data is related to the session hosted at the host device.

As used herein, the term "terminal device" refers to a device configured to provide a user interface for a remotely hosted virtual session to a user associated with the virtual session.

As used herein, the term "management server" refers to a server configured to manage multiple inductive power outlets configured to provide power transfer to electrical mobile electrical devices, and controlling the power charging between an mobile electrical device and an associated wireless power outlet. The term "management server" may be referred to herein as, variously, as a 'control server", "central server" or a 'server".

As used herein, the mobile electrical device may be referred to herein as, variously, a 'user device", an "electrical device", an "electronic device", a 'mobile device", a 'communication device" or a 'device". The device may be an electrical device with a battery, e.g., a mobile handset, a media player, a tablet computer, a laptop/notebook/netbook/ultra-book, a PDA or the like. Alternatively, the device may be an accessory with a battery, such as earphones, watches, wearable devices and the like, or a stand-alone battery. As a further alternatively, the device may be any powered device, including electrical devices without a battery.

The portable wireless power transfer unit point may be referred to as, variously, a "PAP", a "hotspot", "charger" or a "charging spot".

As used herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a 'SIM' card, other smart cards, and various other mediums capable of storing, containing or carrying instructions or data.

For the purpose of clarity in description, the following description describes systems, devices, methods, and software for dynamically updating a session based on data received from an access card reader. However, it should be understood that the same principles may be applied to the receipt of authentication data from any type of peripheral or standalone access or authentication device, including access card readers, smart card readers, biometric data readers, keypads, buttons, near field communications (NFC) devices, and the like.

Management Server Functionality

The management server may be capable of integration with external servers or services. Some integration may be for data enhancements and external validation of rights for users or devices, and others may be for managing a certain functional aspect of the system, such as: network management and monitoring, maintenance of remote units, policy enforcement, user management, device management, billing, advertising, coupon offering, promotions, socializing and the like.

Various functionalities may be available through the power management software, and may also be available to third-party applications through application programming interfaces (APIs) for the server or another client application. Without limiting the scope of the application, selected functionalities may include, amongst others:

- Using satellite positioning, antenna triangulation, wireless network locations or in-door positioning micro-location (for example, inferred from power transfer session) information to display a map with nearby public charging spots.
- Booking a portable wireless power transfer unit (charging spot) in advance, and accordingly, the booked charging spot will not charge for other users, only for the registered user when he arrives, and identified by the unique RxID.
- Registering devices.
- Checking power transfer statistics.
- Buying accessories, charging policies.
- Checking real-time power transfer balances for registered devices.
- Setting notification methods, receiving notifications.
- Setting an automatic check-in to the charging spot location.
- Setting automatic interactions with social networks, e.g. automatic check-ins, tweets, status updates, and the like.
- Providing store-specific promotion updates via push notifications, or via in-app messages, for example, based on past and current usage of power transfer services and user's micro-location.

Providing conditional access to power, for example by providing a user interface via which a user may activate the power transfer perhaps by performing an actions such as pressing a button, viewing an advert or the like.

Using accumulated information of the usage of the wire transfer service, including locations and the like, to better target users with promotions/ads.

Creating loyalty plans for venues based on usage of the wire transfer services in their premises.

Providing services to users based on information that their social-network connections are/were at a close proximity.

Launching a third party application on a user's device based on past or current usage of power transfer services and user's micro-location.

Collecting statistical information associated with usage of the application

It is noted that if communication with the server cannot be established, the application may allow the providing of power transfer based on a predefined "offline policy".

System Architecture

Some embodiments representing the current system architecture may use Client/Server technology, but are not limited and may use other network architectures such as a peer-to-peer architecture, where each node has equivalent responsibilities.

In software engineering, Client/Server architecture refers to a network architecture where each computer, device or process on the network is either a client or a server. Such network architecture are applicable to enterprise applications, and generally the presentation, application processing, and data management functions are logically separated and operable on various nodes (tiers) of the system.

The client software (may be referred to as the user agent) allows the interaction between the client machine (a dashboard terminal, a workstation, a dedicated portable wireless power transfer unit or an electrical mobile device) and the application layer. When web-based applications are used, the client node (usually a browser) renders the user interface, which may be generated by a presentation layer on the client side or the server side by interpreting the HTML, Java applets, or ActiveX controls, for example.

The presentation layer is software allowing the visualization functions for the application (on a dashboard terminal, electrical mobile device) and may comprise of static objects such as images, form fields receiving retrieved data from the database layer, or may use dynamically generated objects to allow populating the data appropriately, and displaying the result of the analysis or computation produced by the application layer. The output of the presentation layer may be submitted to a dashboard, and further formatted to be presented on a terminal dashboard, for example. On web-based applications, the presentation layer may be implemented by web servers.

The application layer provides the business logic of the distributed system of wireless power transfer network and the management software may be installed on a management server. The application layer may receive procedure invocations from the presentation layer, to which it returns the results of the application logic (computation or the analysis) performed on the management server. The application layer may further communicate with the database layer to store, update and retrieve data. The management database layer may store the application data, such as business logic and policies, third party business related information, user information, geographical locations, device IDs, power transfer duration and additional related information. The management database software may be installed on the management server or on a separate server (node). For any case, a database interface may be required in order to implement the business logic, allowing connecting to the database server(s) to retrieve, update and store data.

It is noted that in software engineering, such a complex client/server network architecture in which presentation, application processing, and data management functions are logically separated are referred to as a multi-tier architecture. The most widespread use of multi-tier architecture is the three-tier architecture, where the client may be the first tier (presentation layer), the management server is the second tier (application logic processing) and the database server is the third tier (data management).

Further, the interaction between the mobile electrical device and portable wireless power transfer unit may fit under the technology of two tier Client/Server architecture, where the portable wireless power transfer unit may act as either the server or client as required. Additionally, the portable wireless power transfer unit, in a mode of transmitting data, serves as a client responding to application logic requests (from the management server).

Client-server architectures, in their simplest form, are sometimes called two-node (tier) architecture. Three-node (tier) architecture of a Client/Server system is typically composed of a presentation node, a business or data access node, and a data node.

Management and User Identification

It is noted that data gathering of a wireless power transfer system deployment, distributed in various geographical locations may provide additional revenue channels to a business using advanced data analysis methods applicable to the gathered data, and may offer direct and indirect incentives to business and individual users related by adding to future purchase of goods, maintenance, deployment changes to answer demand and the like, by providing a data analysis layer of usage reports, statistics and trends, for example.

In order to enable this type of model, a simple and convenient method may be required for associating a user with a specific mobile electrical device and to a specific portable wireless power transfer unit (wired or wireless), based upon identification data, and possibly synchronized by a close handshake communication of the devices.

The current disclosure relates to a system for enabling this task to be accomplished automatically and with no user intervention. The system may utilize preexisting transmitters that may be common amongst many mobile electrical devices with additional software management applications to them. Such an implementation may allow for the mass deployment of the system with little or no additional cost or inconvenience to the user.

It is particularly noted that although described primarily in relation to inductive power chargers, the current disclosure may apply to any power providing schemes and are not limited to, say wired or wireless charging schemes.

Optionally, the customer configuration management portal may use various screens to allow various functional manageability, such as: Portable/non-portable wireless power outlet management, Venues management, Users' management, Policy management, Reports, Auditing for configuring and managing systems' events, Security management and the like.

Optionally, portable/non-portable power outlet management may allow summary view of live status, and detailed view of a specific store to allow managing the store's charging spots and gateways.

Optionally, a portable power outlet may also be associated with a location enabling mechanism such as a Bluetooth beacon (or Wi-Fi associated module, other) attached to the power outlet.

Optionally, the Users' management may allow the new customer's administrator to create or delete a store, assign or deassign a store to a customer administrator (a system administrator functionality), assign or reassign stores to an operator, install a store (with gateways and hot spots), perform uninstall operations of various components, enable or disable users of a customer, issue reports for all the venues and the like.

Optionally, the Reports may allow the following: display graphical representation and textual output files of a single device, a single store or multiple stores; each report may be adjusted to visualize data for a defined week/month/quarter within the last twelve months; the graphical reports may be viewed, printed, or saved to a file in a graphical format, or saved to file in a data format used to generate the report. As appropriate, the generated reports may provide usage per store of the total power transfer time in minutes, say, for a defined period, where store may be identified by a store ID; charging spot utilization for a 24 hour cycle, say, providing the average daily time, in minutes say, per a charging spot per a store; usage per date and trend, providing total power transfer time, in minutes say, per date for all stores, with a linear trend line and possibly, define weekdays and/or weekends in the display; sessions, providing distribution of lengths of sessions and average session length; charging per time of day providing total charging minutes for all stores per hour of day for the defined period; repeat usage, providing rate of returning users and number of repeat visits for power transfer; and device type providing distribution per type of device.

Optionally, auditing may allow the following: create log data for every important event in the system, including: installation or removal of a gateway, installation or removal of a charging spot, rejecting a charging spot as a not "legitimate" hot spot (not in production database), definition or cancellation of a user, customer or store, creation of SN generator file and others.

Optionally, Policy management may allow the following: creating basic policy for power transfer per each day of the week, weekend specific power transfer policy, time slot resolution per a charging spot (or all charging spots in a store) such as a charging spot is active between 8 am-1 pm and 4 pm-7 pm, for example. Further, a policy may be executed at once on all charging spots per store, such as disabling all charging spots or enabling all. Optionally, when an charging spot is configured as 'not available' per policy, its status may be indicated a the LED color, red say, for 'unavailable'.

It is noted that charging spots availability may be greater than the advertised time.

DESCRIPTION OF THE EMBODIMENTS

It is noted that the systems and methods of the invention described herein may not be limited in its application to the details of construction and the arrangement of the components or methods set forth in the description or illustrated in the drawings and examples. The systems, methods of the invention may be capable of other embodiments or of being practiced or carried out in various ways.

Alternative methods and materials similar or equivalent to those described herein may be used in practice or testing of embodiments of the invention. Nevertheless, particular methods and materials are described herein for illustrative purposes only. The materials, methods, and examples are not intended to be necessarily limiting.

Accordingly, various embodiments may omit, substitute, or add various procedures or components as appropriate. For instance, it should be appreciated that the methods may be performed in an order different than described, and that various steps may be added, omitted or combined. Also, aspects and components described with respect to certain embodiments may be combined in various other embodiments. It should also be appreciated that the systems, methods, devices, and software may individually or collectively be components of a larger system, wherein other procedures may take precedence over or otherwise modify their application.

Figure 2A:
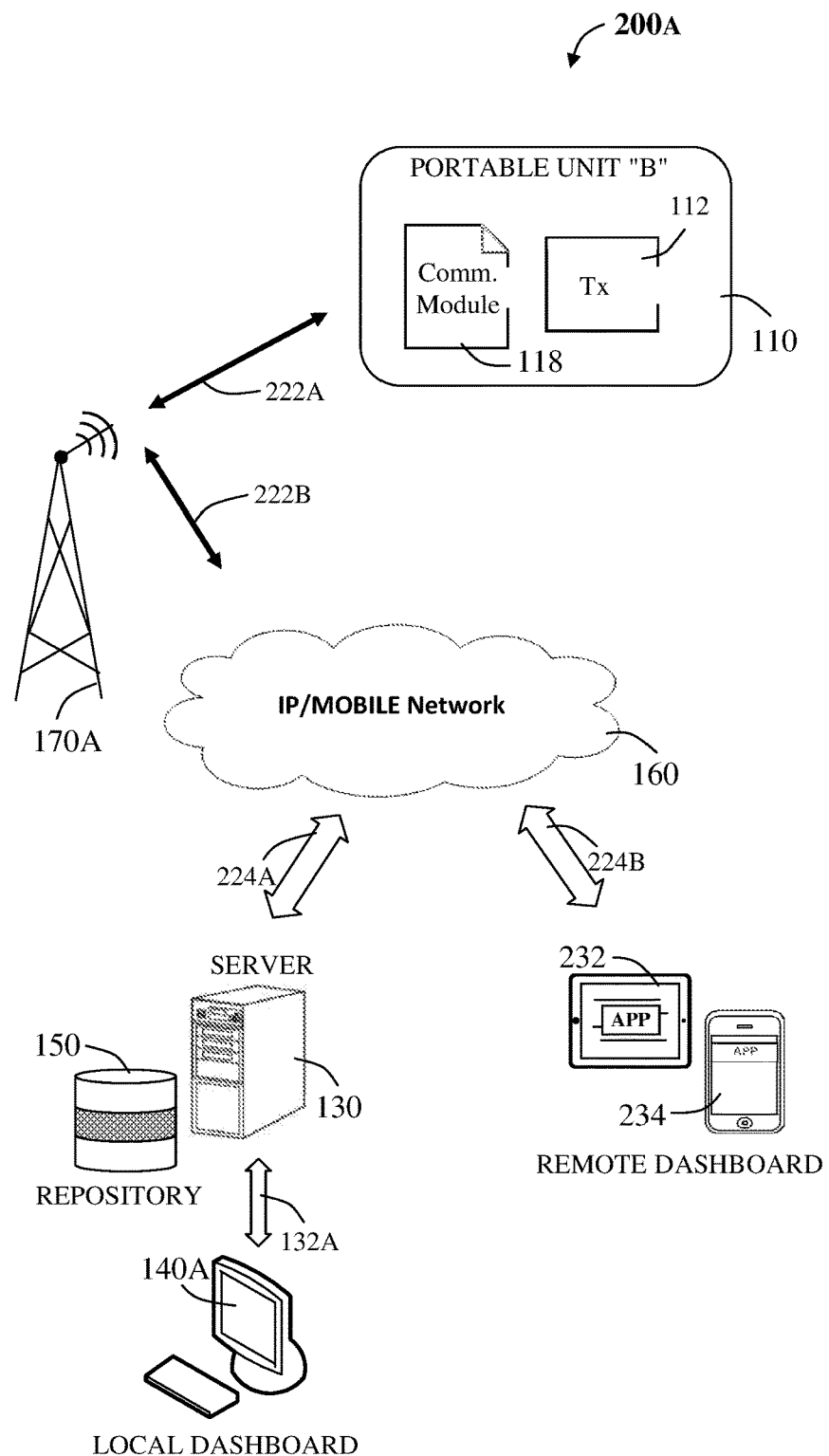
FIG. 2A is a schematic representation of selected elements of a distributed system of wireless power outlet for powering electric devices and manageable via mobile network, according to the presently disclosed subject matter.
Figure 2B:
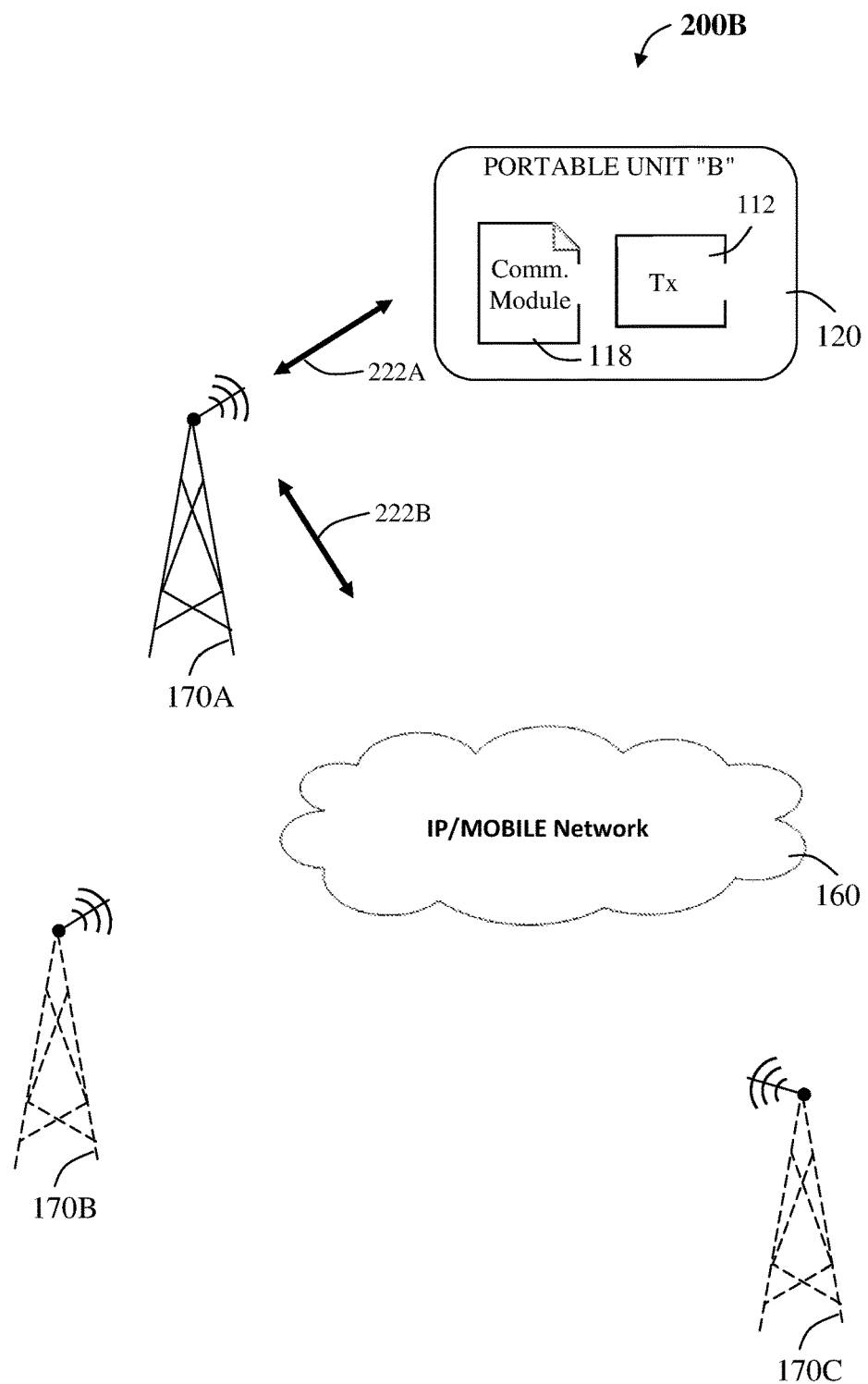
FIG. 2B is a schematic representation of selected elements of a distributed system of wireless power outlet for powering electric devices, manageable over a wide cellular network with a plurality of base stations, according to the presently disclosed subject matter.

The schematic representations of the distributed systems, as shown in FIG. 1 and FIGS. 2A-B illustrate distributed power transfer systems operable for powering electrical devices via a portable wireless power transfer unit. According to the current disclosure, each portable wireless power transfer unit is configured to incorporate a communication module to provide external network connectivity via an internet network or via a wireless network, providing a one box power transfer unit. As appropriate, the communication with the external network may be split into various steps. Alternatively, the wireless power outlet may include a gateway (GW) to allow communicating directly with the external network.

The portable wireless power transfer unit may be operable to form an inductive power coupling. The inductive power coupling consists of a primary inductive coil associated with an inductive power outlet of the portable wireless unit and a secondary inductive coil associated with an electrical mobile device, such as a hand held device, a smartphone, a tablet and the like. The primary coil is wired to a power supply, typically via a driver which provides the electronics necessary to drive the primary coil. An oscillating electric potential is applied across the primary coil which induces an oscillating magnetic field therearound.

When the secondary coil is brought within range of the primary coil, the oscillating magnetic field may induce an oscillating electrical current in the secondary coil and the pair of coils may form the inductive coupling such that power is transferred from the primary coil to the secondary coil. According to requirements, the electric potential provided to the primary coil may oscillate at a frequency which is resonant with the secondary coil or may alternatively oscillate at a non-resonant frequency shifted from the natural resonant frequency of the inductive couple formed by the primary coil and the secondary coil.

In this way a portable wireless power transfer unit may provide power to a wireless power receiving device, while in communication with a remote management server. An electric load wired in series with such a secondary coil may draw energy from the power source when the secondary coil is inductively coupled to the primary coil.

Examples of managing distributed wireless power transfer network and business power management are described in the applicants co-pending application International Patent Application Number PCT/IL2014/050203 filed Feb. 27, 2014, the full contents of which is incorporated herein by reference.

Reference is now made to FIG. 1, there is provided a schematic representation of a distributed system, which is generally indicated at 100, for powering electrical devices via portable wireless power transfer units. The system 100 is manageable over a computer network, such as the internet, for servicing power transfer requirements, providing management functionality and searchable options using the power management software application, according to the current disclosure. The distributed system 100 comprises a portable wireless power transfer unit 110, a management server 130, a management database 150 and a communication network 160.

Optionally, the distributed system 100 for powering an electrical device via a portable wireless power transfer unit comprises a local dashboard terminal 140A.

Optionally, the distributed system 100 for powering an electrical device via a portable wireless power transfer unit comprises a remote dashboard terminal 140B.

It is noted that although only one wireless power outlet 110 is presented, for illustrative purposes only, it will be appreciated that multiple portable wireless power transfer units may be controlled by a common management server 130.

According to the current disclosure, the distributed system 100 of FIG. 1 provides external network connectivity and internet access by each portable wireless power outlet 112, while the distributed system 100' of FIG. 2 provides the external network connectivity for each wireless power outlet 112 via the local venue gateway(s) 118.

It is noted that the power management software provides functionality of device power storage management combining the status of the power storage unit of the electric mobile device, user preferences and current location to offer various power related recommendations and directing the user to the nearest power transfer location, accessible according to the potential locations of servicing wireless power transfer.

The portable wireless power transfer unit 110 comprises two sub-components, the wireless power outlet 112, optionally embedded into a surface 101, and an integral communication module 118. The wireless power outlet 112 further comprises a primary inductor 114 connectable to power supply (not shown) and an electrical mobile device, such as a tablet 122 (or a smartphone, a laptop and the like), each comprising a secondary inductor 116 connected to a load and capable of coupling with the primary inductor 114 to allow wireless power transfer to the electrical mobile device. The wireless power outlet 112 may, alternatively, be referred to as a charging spot (CS) and may further include a LED display operable to display on/off/dimmer/fade-in-out signals.

It is noted that the mobile electrical device such as the tablet 122 may have a unique identifier, which may be referred to as a receiver identification (RxID). The mobile electrical device 122 may be identified by a wireless power outlet 112 when the electrical mobile device 122 and the wireless power outlet 112 are in close proximity. The wireless power outlet 112 may have a unique identifier, which may be referred to as a transmitter identification (TxID).

It is further noted, that communication between the wireless power outlet 112 and the mobile electrical device 122 may use the communication channel 115A to communicate between one another, optionally establish credential exchange to allow power transfer.

The wireless power outlet 112 may communicate with the communication network 160 via the communication module 118 and further through a communication channel 123A, allowing internet-based communication and further communicating with the management server 130 through communication channel 124A, which in turn, may communicate with the management database 150 via a communication channel, whether the management server and the management database are installed on the same machine, or separately.

Optionally, the management server 130 may be configured to be accessed by a remote dashboard terminal 140B via a communication channel 124B.

The communication process between the wireless power outlet 112 and the management server 130 via the communication module 118, may be operable to perform sending of various periodic status and non-periodic events. The various events may include TxID, RxID identification parameters and additional information such as starting power transfer, stopping power transfer, modifying service in some way, receiving server permission commands, on/off commands for aborting power transfer or resuming, charging balance status and the like.

The local terminal dashboard 140A and the remote terminal dashboard may be selected from a group consisting of a terminal screen display, a personal computer, a laptop computer, a tablet, a smartphone, other hand held devices and the like.

Where appropriate, the local terminal dashboard 140A may use the communication channel 132A to communicate with the application layer of the management server 130, using the relevant communication technology.

Where appropriate, the remote terminal dashboard 140A may use the communication channel 124B to communicate with the application layer of the management server 130 through the internet network, using the relevant communication technology.

It is noted that the wireless power outlet 112 may communicate with the mobile electrical device 122 exchanging identification information, and further send periodic status messages and non-periodic events to the management server 130 via the communication module 118. This type of communication, based upon the wireless power transfer may provide exact indication of the current location of a user and may be to provide more accurate location based recommendation combined with user preferences, if no other positioning system is operable.

Reference is now made to FIG. 2A, there is provided a schematic representation of a distributed system, which is generally indicated at 200A, for powering an electrical device via a portable wireless power transfer unit and receivers. The system 200A is manageable over a cellular network for servicing power transfer requirements providing management functionality and searchable options using the power management software application, according to the current disclosure. The distributed system 200A comprises a portable wireless power transfer unit 110, a management server 130, a management database 150, a cellular base station 170A and a communication network 160.

Mobile data communication has become a very important and rapidly evolving technology allowing to transmit data from remote locations, providing solution mobility related issues. Cellular or mobile network is a wireless network distributed over land areas, each serviced by a base station. The base station may act as a transceiver (a radio receiver/transmitter) serving as the hub of the local wireless network and connecting a number of other devices to one another and/or to a wider area. The base station may provide routing for computers in the network, possibly connecting them to a local area network and/or the internet and may also be the gateway between a wired network and a wireless network.

The portable power transfer unit 110, connectable to a power source (not shown) includes a wireless power transfer outlet 112 and an integral communication module 118. The portable power transfer unit 110 is further operable to use the integral communication module 118 to gain access to the communication network 160 via a communication channel 222A through a cellular base station 170A and further via a communication channel 222B. The integral communication module 118 is enabling the wireless power outlet 112 to send periodic status and non-periodic events and reporting the management server 130. The various events may include a TxID, an RxID identification parameters and additional information such as starting power transfer, stopping power transfer, modifying service in some way, receiving server permission commands, on/off commands for aborting power transfer or resuming, charging balance status and the like.

Optionally, the distributed system 200A for powering an electrical device via a portable wireless power transfer unit comprises a local dashboard terminal 140A.

Optionally, the distributed system 200A for powering an electrical device via a portable wireless power transfer unit comprises a remote dashboard terminal, such as a tablet 232 and a smartphone 234.

The local terminal dashboard 140A and the remote terminal dashboard may be selected from a group consisting of a terminal screen display, a personal computer, a laptop computer, a tablet, a smartphone, other hand held devices and the like.

Where appropriate, the local terminal dashboard 140A may use the communication channel 132A to communicate with the application layer of the management server 130, using the relevant communication technology.

Where appropriate, the remote terminal dashboard such as the tablet 232 and a smartphone 234 may use the communication channel 224B to communicate with the application layer of the management server 130 through the internet network, using the relevant communication technology.

It is noted that although only one wireless power outlet 110 is presented, for illustrative purposes only, it will be appreciated that multiple wireless power outlets may be controlled by a common management server 130.

Reference is now made to FIG. 2B, there is provided a schematic representation of a distributed system, which is generally indicated at 200B, for powering an electrical device via a portable wireless power transfer unit and receivers. The system 200B is manageable over a wide cellular network for servicing functionality as described hereinabove in FIG. 2A. The distributed system 200B comprises a portable wireless power transfer unit 110, cellular base stations 170A-C and a communication network 160. The plurality of base stations 170A-C support a wider network architecture allowing to cover additional land areas and provide a wider scale mobile network.

Figure 3:
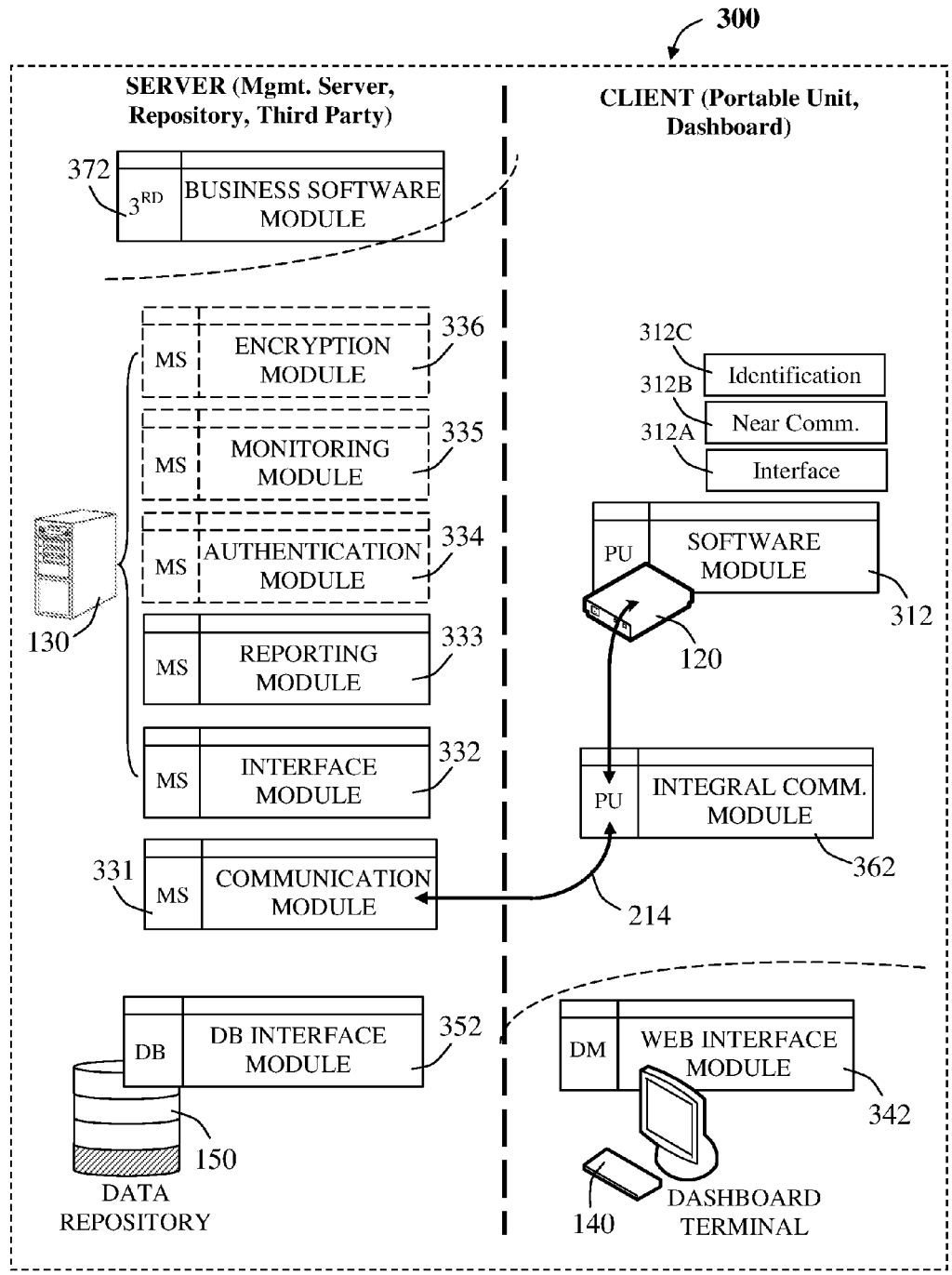
FIG. 3 is a block diagram representing a possible software module architecture of a wireless powering system 300 of a portable power transfer unit, according to the presently disclosed subject matter.

Reference is now made to FIG. 3, there is provided a block diagram representing a possible software module architecture, which is generally indicated at 300, of a wireless power transfer unit.

The wireless power transfer system 300 comprises a portable wireless power transfer unit 110, a management server 130, a data repository 150, and a communication network (not shown). Optionally, the wireless power transfer system 300 may further comprise a dashboard terminal 140 and may allow connectivity with a business entity machine of a third party vendor (not shown) installed with a business software module 372.

The portable wireless power transfer unit (PU) 110 may include a software module 312 comprising sub-modules such as an interface 312A, a near communication module 312B and an identification module 312C and the like. Communication with the management portable wireless power transfer unit portable unit and the communication module 331 of the management server using IP/Mobile network connectivity.

The management server (MS) 130 may further include additional modules, such as an interface module 332 and a report generation module 333. Optionally the management server may include an authentication module 334, a monitoring module 335 and an encryption module 336.

The data repository 150 may include at least one database and comprises a database (DB) interface module 352. The DB interface module 352 may be sub-divided into several sub-modules, if the data repository is made up of several databases or if additional secondary data sources exist.

Further, the integral communication module 362 of the portable wireless power transfer unit (FIG. 1, 110) and the communication module 331 allow communication to be established between the various system components. Variously, the communication modules may use different communication technologies, such as IP technology, mobile technology, proprietary communication protocols and the like to allow various communications. Variously, communication between the portable wireless power outlet and the electrical mobile device, communication between the portable wireless power transfer unit (FIG. 1, 110) and the management server (FIG. 1, 130), and communication between a dashboard terminal (FIG. 1, 140A) and the management server (FIG. 1, 130). Optionally, where the dashboard terminal is using electrical mobile devices such as a tablet or a smartphone, the communication may use cellular communication technology, for example.

Optionally, if a business entity machine of a third party exists, it needs to be installed with a business software module 372, operable to interface with the management server 130, accordingly.

Optionally, if a dashboard terminal exists, it needs to be installed with an appropriate web-interface module 342, for example, to allow access and visualization of the distributed system.

The Communication Module

The communication module reflects various aspects of the communication requirements between the components of the wireless power transfer distributed system, and may differ while answering different communication needs of the components. For example, the communication needs between the mobile electrical device and the portable wireless power transfer unit may expose different functionality and technology in comparison to the communication needs between the portable wireless power transfer and the management server. Thus, when referring to the communication module, it is intended to clarify the various aspects and the communication technology that may be associated with specific interaction.

It is particularly noted that the communication module associated with the portable wireless power transfer unit may be an integral component incorporated into the unit itself and configured to support various communication channels: between the power transmitter (Tx) and the communication module; between the communication module and a gateway (GW); and between the gateway (GW) and the external network. Each such communication channel may be based upon various physical layers, where the different stages may be combined or partially combined.

It is further noted that the integral communication module of the wireless power outlet may be implemented as a software module. Optionally, the integral communication module may be implemented as an electric circuit simulating the communication software module.

Communicating with the Management Server

Optionally, the mobile electrical device may have a wireless LAN/WAN communication unit, which does not necessarily have to match the LAN/WAN transmission unit of the wireless power outlet. Furthermore, the mobile electrical device may include a near communication module capable of communicating with the module on the portable wireless power transfer unit. Optionally, the communication unit may use Wi-Fi, ZigBee, Bluetooth and the like. The management or control server may be in communication with the portable wireless power transfer unit, the electrical mobile device, or both. The communication channel may be mediated by wireless access points, cellular networks (FIGS. 2A-B), wired networks or the like that may provide an internet protocol (IP) connection to at least one of the electrical devices or the portable wireless power transfer unit. It is further noted that optionally, the communication channel to the portable wireless power transfer unit may be mediated indirectly via the electrical device and the close communication module. Similarly, the communication channel to the electrical device may be mediated indirectly via the portable wireless power transfer unit.

Tx-Rx Communication

Each electrical device may have a unique identifier, which may be referred to as a receiver identification (RxID), in the system that allows the recognition thereof. The RxID may be a MAC address. The management server may store user or mobile electrical device related information in addition to the RxID, such as power transfer related data, billing information, user credits or the like.

Where appropriate, wireless power outlets may have a unique identifier, which may be referred to as a transmitter identification (TxID), in the system that allows the recognition thereof.

For illustrative purposes only, possible methods for providing access to power for electrical devices in public spaces are presented hereinafter. The method may allow a user to transfer power or charge an electrical device such as a mobile phone, a tablet or the like from a portable wireless power transfer unit and may further allow a power provider to manage the power transfer, while gathering power transfer related information.

A user may place or connect an electrical device to a portable wireless power transfer unit. For example an inductively enabled device may be placed upon a portable wireless power transfer unit. Alternatively, or additionally, a power supply may be conductively connected to an electrical device.

The power access point may detect the electrical device connection. For example, wired connection may be detected by detecting the load and wireless connection may be detected using various remote sensors such as hall sensors, analog ping schemes or the like.

Initial Authentication/Handshake

The portable wireless power transfer unit may enable power transfer for a predefined time $T_{free}$ during which time period user credentials may be authenticated.

Optionally, the wireless power transfer unit may transmit a random pattern to the device via the close communication. The wireless power transfer unit may further transmit the same pattern to a control server via a WAN/LAN connection.

For example, a software application running on the electrical device may be operable to receive the pattern and to relay the same pattern to the management server along with user identification token.

Variously, the management server and electrical device may exchange multiple messages to complete authentication of the user.

Optionally, the wireless power outlet may initiate a registration process, via the integral communication module, upon first-time interaction with the management server to determine initial setup, providing credentials to allow accessing the management server. It is also noted that the first-time authentication may be used for the agreement of the management server to manage the outlet Tx and agreement with regard to the identification of each side, the identity of the outlet Tx and the identity of the management server, for any further communications.

The management server may thereby be able to associate the specific wireless power outlet with the specific electrical device. If the user is deemed permitted to use the service the management server may send a confirmation signal via the integral communication module allowing the wireless power outlet to continue servicing the electrical device. Where required, the confirmation signal may define a specific time period for which the service is granted or send a disconnect event on termination of that time.

Where appropriate, the management server may additionally or alternatively define multiple levels of service, for example, as expressed in terms of current provided to different users. By way of example, paying users may be enabled to access full powering capability, perhaps up to 20 watts or so, while non-paying users may be provided limited access, to say 0.5 watts which may be sufficient to charge only low power devices or perform trickle charge for completely depleted batteries. The information of how much power was consumed by the secondary should come from the secondary side (CPR messages as defined in the spec). Nevertheless, a rough estimation may be performed in the Power Transmitter (Tx) side based on the transmitted power with margins for transfer efficiency.

During operation the wireless power outlet may be operable to receive operating signals from the management server via the integral communication module. According to the operating signals received, the wireless power outlet may be operable to perform various actions such as to continue providing power, to abort power transfer, to modify the service in some way or the like.

As noted herein, various methods may be implemented for enabling close communication between the electrical device and the portable wireless power transfer unit.

Audio Communication

In one particular embodiment, the close communication channel between the device and power access point may be based upon audio signals sensed via a microphone of the electrical device, for example using specific ultrasonic or audible bands, between 20 hertz and 20 kilohertz, between 300 hertz and 20 kilohertz, above 20 kilohertz, between 20 kilohertz and 25 kilohertz, above 25 kilohertz say or the like. The audio signal may be emitted from a transceiver or an audio emitter such as a speaker or the like associated with the portable wireless power transfer unit. Many electrical devices, such as mobile phones and the like have microphone and software applications may have access to the microphone.

It is noted that powering the microphone unit may itself demand power. Consequently, the software application running on the electrical device may activate the microphone only where 'a-charge-connect' event is detected in the system. Accordingly, upon detection of the device, the wireless power outlet may provide an initial power transfer to power the microphone. After a short interval, an identification signal may be sent via the audio signal.

The audio signal may include additional tones that are not related to the communication pattern which may mask the random patterns communicated. For example, an audio identification signal may be masked by a connection tone serving to provide users with an indication that a connection has been made.

Data-Over-Coil (DOC) Communication

Alternatively or additionally, the close communication channel may be provided by the wireless power outlet alternating the activation of power transfer to the electrical device. The alternation of power supply is detected by most electrical devices as power transfer connection and disconnection events that are communicated to the application layer on these electrical devices.

The switching pattern may be coded with an identification signal such as the random pattern. The wireless power outlet may need to perform this switching in intervals spaced sufficiently apart to allow the electrical devices to detect and report to application level power transfer connection and disconnection events.

Bluetooth and NFC

Still other embodiments may use Bluetooth, Low Energy Bluetooth or Near Field Communication (NFC) to achieve the close communication channel. These could be combined with the basic power signal to trigger their activation thereby conserving power.

Accordingly the wireless power transmission and receiving units may include a BLE radio transmitter operable to transmit between −6 and 8.5 dBm and a BLE receiver having a sensitivity of say −77 dBm or better, for example as measured at the antenna connector.

In various embodiments of this system the LAN/WAN interface of the device may be WLAN or Cellular 2G/3G/4G connections. The connection to the WLAN or Cellular access point may also include manual or automatic insertion of user credentials. In this case the information may be conveyed to the management server to enable user identification. The information provided in order to allow access may also be stored by the device application and later provided directly to the management server.

Additionally, or alternately the LAN/WAN connection of the wireless power outlet may be achieved via the charged device. The wireless power outlet may encrypt messages to the management server and deliver this to the application on the electrical device via the close communication channel therebetween. The application may then send the message to the server via its LAN/WAN connection.

It is noted that there are various possible ways to communicate between the power receiver (Rx) and the power transmitter (Tx), including Infra-Red (IR) and any other known communication channels. Optionally, the choice of the actual communication channel may be implementation dependent.

Database Interfacing

The management server may provide an Application Program Interface (API) to allow the various component applications to access the management server, with further applicable access to data stored in the database(s). Accessing the database directly from the management server may use a command shell, which may come bundled with about every database selected.

The data may be stored in tables (relational database such as Oracle, Informix, Microsoft SQL Server, MySQL, NoSQL and more), objects (object oriented database) or documents/files (documented oriented database such as XML—Extensible Markup Language) and the like.

The database, installed on the same physical machine or separately, may be accessed through a common database interface such as Sequence Query Language (SQL).

Alternatively, the database may be accessed by an object oriented API, providing database-abstraction API to create, retrieve, update and delete objects, or use XML based API or the like.

It is noted that that each API may be implemented in various computer languages such as C, C++, C#, Java, JavaScript, Python and the like.

It is also noted that the interaction with the database may be transaction base, allowing to configure a set of commands. For example, anything between the 'transaction start' and 'transaction commit' methods are not executed until 'transaction commit' is called, if no exception occurs. Rolling back the changes and cancelling operation may use a 'transaction rollback' method, returning the database to the original state if a problem occurs even though a number of changes may have executed to the database's tables.

The Encryption Module

The Encryption Module may be responsible for encrypting instructions from the server to the portable wireless power transfer unit, and may further be delivered to the charged device which will relay them back to the wireless power outlet via the close communication channel.

Where applicable, the encryption may only allow the server and portable wireless power transfer unit to encrypt/decrypt the messages but would prevent the charged device from altering or creating a legal message. Accordingly, the transfer of the messages from server to portable wireless power transfer unit may require the existence of a bidirectional close communication channel. For audio signals this may be achieved by using the device speaker and including a microphone on the portable wireless power transfer unit.

Additionally or alternatively, a bidirectional power based signaling scheme may be achieved by modulating the load of the device on the wireless power outlet. As many devices do not allow applications to directly control the charging current used or the system load, it may be required to use some indirect techniques such as modulating screen illumination back light for LCD and direct pixel activation for OLED to vary the load.

It is further noted that wireless power transfer systems may offer additional options for close communication channels.

Figure 4:
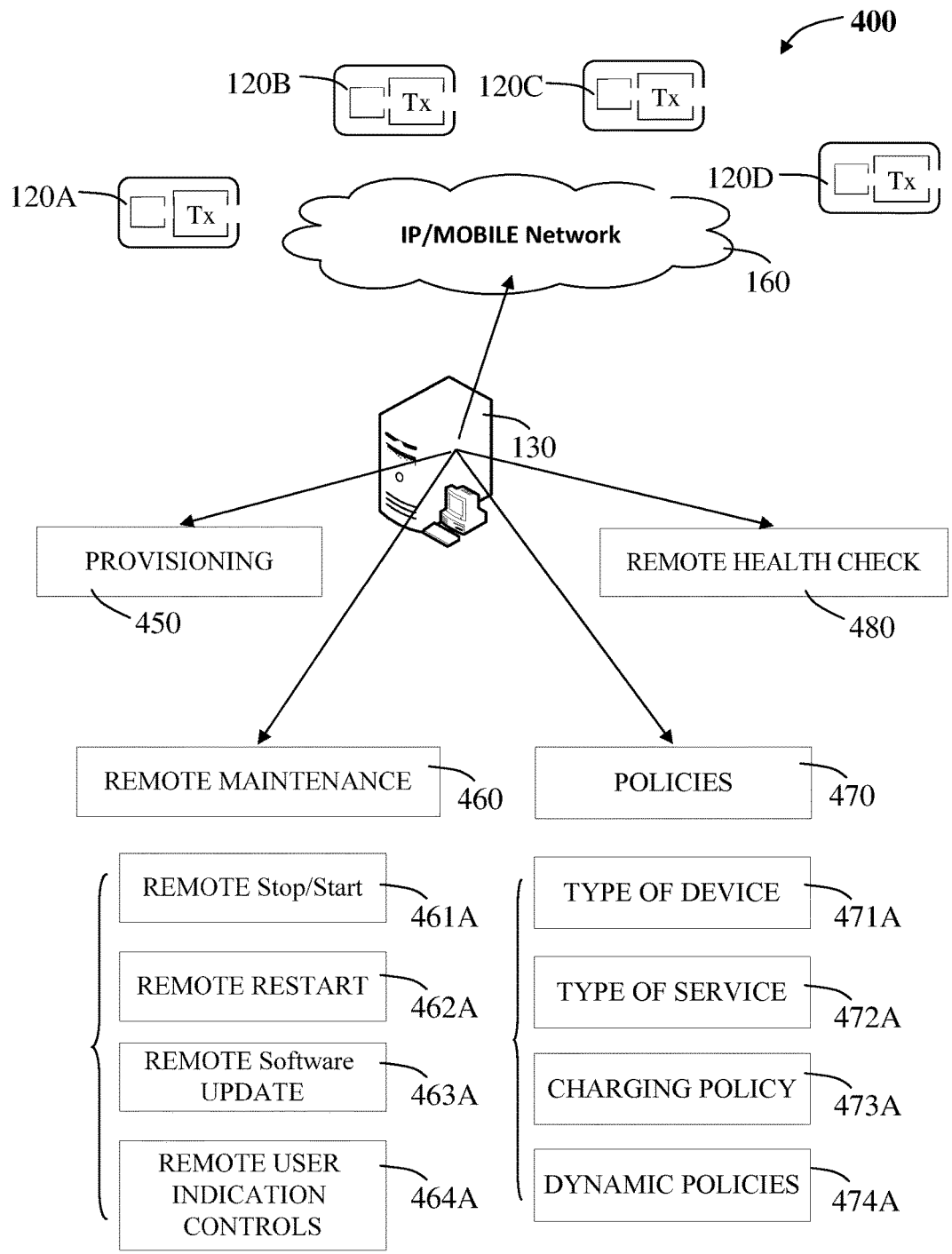
FIG. 4 is a block diagram representing selected actions of possible procedures covering aspects of the management functionality of a management server: health check, remote maintenance, provisioning and policy controlled power transfer, according to the presently disclosed subject matter.

Reference is now made to FIG. 4, there is provided a representation of selected actions, which is generally indicated at 400, of possible procedures for the administrator to manage a portable wireless power transfer unit configuration in a remote location. The possible management functionality and procedures may include monitoring and controlling a deployment of a portable wireless power transfer unit, providing provisioning 450 data, remote maintenance 460 policies management 470 and remote health check 480.

It is noted that the management server 130 may support direct interaction through the communication network 160 with each remote portable wireless power transfer unit 120A-D in a specific remote location, by communicating with the portable wireless power unit via its integral communication unit (FIG. 1, item 118 and FIG. 2, item 218) to control each portable wireless power transfer unit 120A-D.

The provisioning 450 procedure, may include communication with the provisioning software application of an electric device, to provide the provisioning policy for a user when in communication with a wireless power outlet in a location. The provisioning 450 procedure may further provide reporting functionalities, mapping of power transfer location according to electric device location and the like. The provisioning software application of an electric device may be used for paid power transfer, enabling to monitor and control power charging of the device.

The remote maintenance 460 procedure, may provide remote management of the portable wireless power transfer unit and may include remote stop/start 461A, remote restart 462A, remote software update 463A, and testing of remote user indication 464A such as a visual interface such as a LED indicator for example or an audio interface such as a speaker of other such sound generator.

The power management policies management unit 470, provides functionality of determining a set of policies of various aspects for controlling the portable wireless power transfer unit when interacting with a power receiver of an electric device. The power management policies management 470 procedure may generate various power management policies that may be appended into a single control policy. The policies management unit 470 may include type of device policy 471A, type of service policy, and a power transfer policy 473A. The policies management 470 may further include various dynamic policies 474A such as real time optimization of power consumption, real time optimization of battery health and may further control traffic at the venue site by communicating with members in the social space, for example, to add more traffic into the venue by suggesting to meet friends, advertising businesses in the vicinity with characteristics related to user preferences based on real time parameters and the like.

The remote health check 480 testing a remote portable wireless power transfer unit may be used to test accessibility and operability of the portable wireless unit and if the portable wireless unit is reachable across the network. Further, the process analyzes the connection's latency, determining the network speed, which may also be presented to the system administrator. Such a health check may be triggered on demand for a specific wireless power transfer unit in a specific venue, testing its status or may be triggered sequentially for all listed, potentially operable, portable wireless power transfer units in a network when the network system is presented on the management server console, upon administrator communication request, providing various related parameters, including the status of the portable wireless power transfer unit itself.

Accordingly, the health check procedure 480 may transmit a control signal to the remote portable wireless power transfer unit, waiting to a response within a time limit.

It is noted that the provisioning procedure 450 may communicate with the portable wireless power transfer unit allowing more accurate data for provisioning software applications, such as location. Information regarding the location of the charging spot may be associated with the TxID of the portable wireless power transfer unit. Such location information may be programmed into the charging spot at, e.g., the time of installation, and may provide very accurate location information, which may be more accurate than what may be provided through other methods, such as GPS or antenna triangulation. Where the power provisioning software is an application configured for a mobile device, the charging spot may transmit information regarding itself (e.g., TxID, location, and the like) to the device, which then transfers the information to the application. The application may further identify the location using GPS, antenna triangulation, in-door positioning methods and the like. Such data, may be transmitted by the portable wireless power transfer unit to the provisioning layer of the management server.

It is further noted that the various policies and other business related matters of the policies management procedures 470, may be stored centrally in the database of the management server (130, FIG. 1), may include power transfer policies of the service supplier and/or provider, various policies, agreements or offerings of public business entities that may be relevant from end user perspective, and the like.

The outcome of the set of procedures may yield options enabling the administrator or the user various actions such as to serve food at the micro-location, get address and business hours, locate the public entity destination on a map, get driving directions, adjust search radius to reduce or expand number of possible options, filter by brand of the public entities, filter by ranking of social space members, number of charging spot in a specific public entity, coupons and promotions, receiver accessories sales and the like.

Reference is now made to FIGS. 5A-C, showing a schematic representation accessible on a management console. FIG. 5A is showing a schematic representation of a possible portable power transfer units network view, centrally managed and FIGS. 5B and 5C are showing details views of a selected device such as an icon representing a portable power transfer units 120A-H It is noted that the power management software of the management server may provide functionality of outlets' power management in various aspects such as wireless power transfer and provisioning, remote maintenance, policy management, unit's health check and the like and also in various system architectures. The management server may further interact with a database, remotely, or incorporated in the same physical machine, to store related data and deliver the necessary functionality and services.

Reference is now made to FIG. 5A, there is provided a schematic representation of a possible portable wireless power transfer network view, which is generally indicated at 500A, accessible on a management console, providing an overview of a deployment, whereby a management server is controlling several portable wireless power transfer units in different remote locations. The network view 500A includes a central management server 130, an associated dashboard terminal 140 (the management console), a communication network 160 to allow the management server to communicate with the networked elements and a plurality of wireless power outlets 120A-H.

Such a networked display, may provide the administrator with an overview of the whole network under his/her administration or a detailed view to perform portable wireless power transfer unit specific actions, such as testing/policy management/upgrading and more. Further, the administrator may select other views, for example, to analyze various aspects of the network, zooming a specific area of the display, selecting a wireless power unit and displaying its status and information in a popup window and the like. Additionally or alternatively, a portable wireless power transfer unit may be monitored, controlling various parameters of monitoring.

Reference is now made to FIG. 5B, there is provided a schematic representation of a possible summary view, which is generally indicated at 500B, accessible on a management console of a wireless power transfer unit 120A for example, accessible by selecting a portable power unit from the distribution view 500A of FIG. 5A and further selecting an appropriate menu option such as open or display, to present the portable power unit detailed information. Optionally, this view may be accessible by double clicking the portable power unit icon representation to receive the detailed information in a popup window, for example. The summary view 500B, may include an outlet ID field 502B, a location field 504B, administrator related information 506B field, a table of content with headers of Device ID 508B, Status 510B, Policy 512B, gateway software module version 514B and more. Each specific row 516B of the table represents basic related data of a specific portable wireless power transfer unit, portable unit 120A (FIG. 5A) for example, and an activation button "Open" 518B.

As appropriate, clicking on the "Open" activation button 518B, when line 516B is selected, may open a popup window to display detailed information of the selected device of line 516B, portable wireless outlet 120A for example, such as exemplified in view 500C of FIG. 5C.

Reference is now made to FIG. 5C, there is provided a schematic representation of a possible status and summary details view, which is generally indicated at 500C, of a portable wireless power transfer unit 120A-120H, optionally accessible on a management console by clicking the open action button 518B when an associated power transfer unit line 516B in FIG. 5B is selected, for example, to present the portable power unit detailed information. Optionally, this view may be accessible by double clicking any of the portable wireless power transfer units 120A-120H shown in FIG. 5A to receive the detailed information in a popup window. The summary view 500C may include a device ID field 502C, Device Type field 504C, Status field 506C, Location field 508C, Software Release field 510C, Communication Module Software version 512C and Policy field 514C. The display 500C may further include a 'Reports' action button 516C, 'Maintenance' action button 516C, 'Upgrade' action button 520C, 'More' action button 522C, a 'Policy' action button 524C, a 'Test' action button 526C and administrator related information 528C.

As appropriate the 'Reports' action button 516C may allow to generate a set of reports related to the wireless power outlet like usage over time, idle time, failure events, history of maintenance and the like.

As appropriate the 'Maintenance' action button 518C may allow maintenance operations such as restarting the selected wireless power outlet, install an updated software module or update current running policy and the like.

Optionally, upgrading of the software module of the portable wireless power outlet and the software module of the integral communication unit may be activated by the 'Upgrade' action button 522C. Optionally, the software upgrade may be part of the Maintenance task operation of the device.

As appropriate the 'Policy' action button module 524C may allow policy related operations, such as applying local configuration changes. Optionally, the policy tuning may be maintained via the maintenance action button 518C.

As appropriate the 'Test' action button 526C may allow to perform health checking tests for the remote selected wireless power outlet.

As appropriate the 'More' action button 520C may allow to access to additional action buttons, such as various administrator configuration options, users management, provisioning related activities and the like.

It is noted that a hardware (HW) version may also be applicable, such as when a Bluetooth beacon or another location enabler, for example, is included in the system.

Figure 6A:
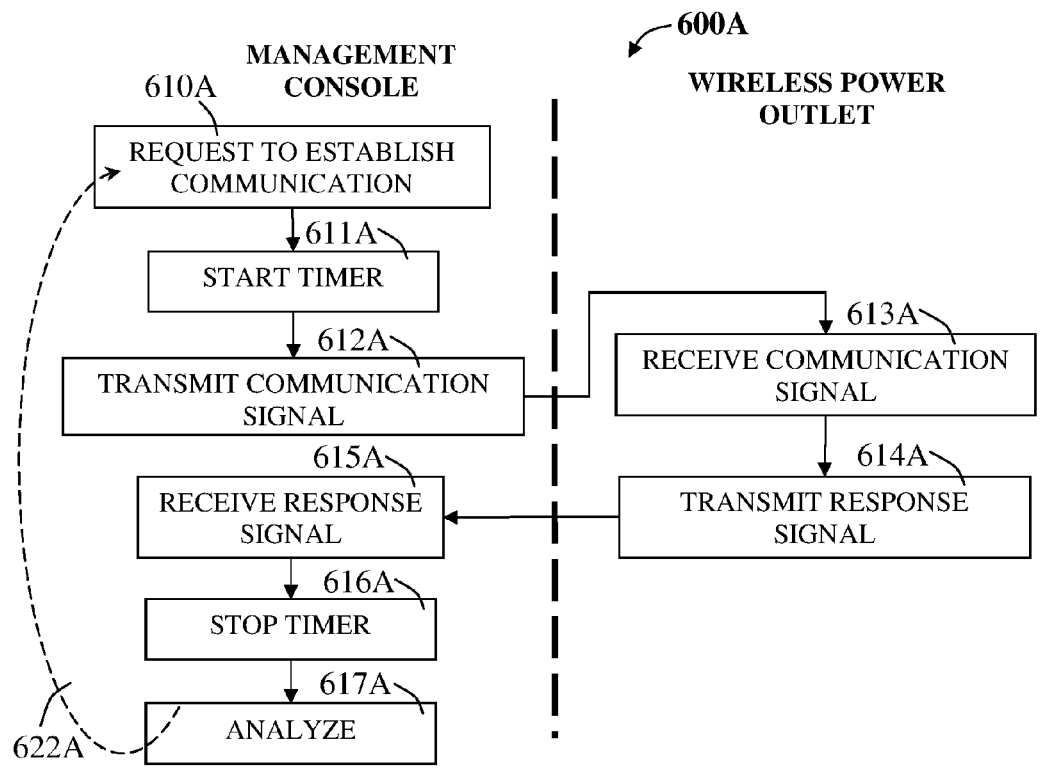
FIG. 6A is a flowchart representing selected actions of a possible method for processing a health check sequence of a wireless power outlet, according to the presently disclosed subject matter.

Reference is now made to FIG. 6A, there is provided a flowchart representing selected actions illustrating possible method, which is generally indicated at 600A, for performing a system's health check of a remote portable wireless power transfer unit in a network deployment. Such a health check may be triggered on demand for a specific portable wireless power transfer unit in a specific location, testing its status or may be triggered sequentially for all listed, potentially operable, portable wireless power transfer units in a network when the network system is presented on the management server console, upon administrator communication request, providing various related parameters, including the status of the portable wireless power transfer unit itself.

It is noted that the status of a portable wireless power transfer unit may change throughout its operation, upon a specific request such as restarting when software update is uploaded to the portable power unit or may be in a faulty status due to some malfunctioning of the outlet unit.

It is further noted that the network may allow control of power provision in public spaces such as restaurants, coffee shops, airport lounges, trains, buses, taxis, sports stadia, auditoria, theatres, cinemas or the like. Accordingly, the operability of each portable power unit in the network is required. Further, there is a need for such systems to enable tracking of an individual portable wireless power transfer unit, in order to provide a platform for efficient powering services boosted with remote monitoring coupled with maintenance functionality (remote restart, remote software updates and the like) to improve efficiency and availability.

The method 600A for a system health check, for example may include activities performed by the management server, automatically, if so configured, or may be triggered upon a specific administrator request. The portable wireless power transfer unit, is expected to respond to the communication request within a time limit to prove its satisfactory health status, reflecting an 'on' status. No response, implies a time-out situation and may result in presenting the portable wireless power transfer unit status as 'off'. If, for example, the response is slow, the status of the portable wireless power transfer unit may be referred to as 'faulty'.

It is noted that the health check of the remote portable wireless power transfer unit is used to determine verify if the remote outlet is reachable across the network. Further, the process analyzes the connection's latency, determining the network speed, which may also be presented to the system administrator.

The process starts with a request to establish communication—step 610A with the target portable wireless power transfer unit, followed with a timer start—step 611A to allow measuring response time; a communication signal is then transmitted to the remote selected portable wireless power transfer unit—step 612A; and the communication signal is received—step 613A and the portable wireless power transfer unit, then responds with a communication signal—step 614A; when the communication signal transmitted from the portable wireless power transfer unit is received on the management server, the timer is stopped—step 616A; and the response time is analyzed—step 617A to allow indication of the current portable power unit status, for example, 'on', 'off', 'faulty' and the like. Where appropriate, the operation may be repeated as configured, say 4 times, to allow proper indication and may further repeat the cycle at a time interval or may be continuously repeated. The repeated manner or time interval of measuring may use default setting or may be configured by the system administrator.

It may be noted that the status indication on the network configuration of the management console may be enriched with additional text, color, blinking effects and the like.

It is further noted that technically, such a process may use a proprietary communication protocol, Internet Control Message Protocol (ICMP) or known communication tool such 'ping' and the like. As appropriate, 'ping' is a computer network tool used to test whether a particular host is reachable across an IP network.

Figure 6B:
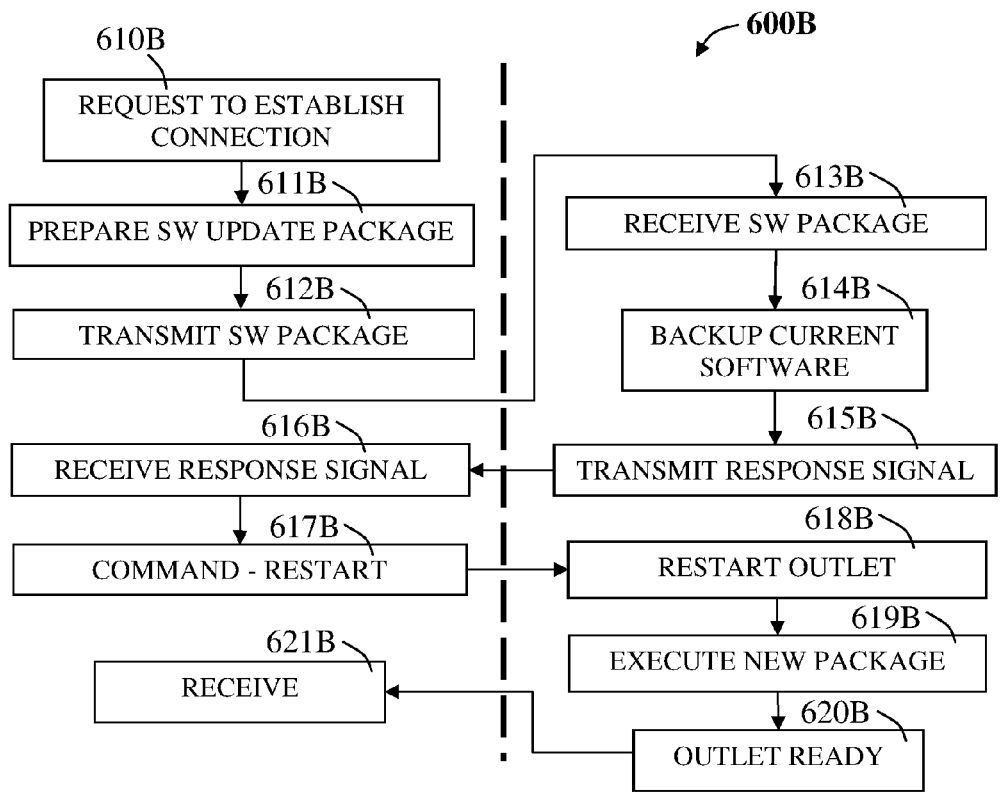
FIG. 6B is a flowchart representing selected actions of a possible method for processing a software update sequence of a wireless power outlet, according to the presently disclosed subject matter.

Reference is now made to FIG. 6B, there is provided a flowchart representing selected actions illustrating a possible method, which is generally indicated at 600B, for performing a system software update to a remote portable wireless power transfer unit in a network deployment. Such a software update may be triggered on demand for a specific portable wireless power transfer unit in a specific venue, for fixing a portable power unit problem, for example, or may be triggered sequentially for all listed and operable portable wireless power transfer units in a location or network by a system administrator. Optionally, after software update of a portable wireless power transfer unit, the device needs to be restarted in order to shut down the previous version and execute the new update. Where appropriate, the previous software version may be stored on the portable wireless power transfer unit storage unit, for a backup, providing restore functionality.

It is noted that the installing a software update may be required to fix a known fault or may be necessary to make use of new software features.

It is further noted that there is a need for such system to enable tracking of individual portable wireless power transfer units, in order to provide a platform for efficient powering services boosted with remote monitoring coupled with maintenance functionality (remote restart, remote software updates and the like) to improve efficiency and availability.

The method 600B of system's software update includes activities performed by the management server. These actions may be triggered automatically if so configured, alternatively or additionally the actions may be triggered upon a specific administrator request for a single unit, or install a set of software updates following multiple selections. Optionally, the portable wireless power transfer unit may need to restart after storing the software update package, and execute the package after restart depending of the nature of the software update. Such an option may be configured specifically for each software update.

The process may start with a request to establish communication—step 610B with the target portable wireless power transfer unit, followed by a step of preparing the software update package—step 611B; and then the software package is transmitted—step 612B to the remote portable power unit; the software package is received on the remote portable power unit—step 613B, optionally stored on its storage unit; and creating a backup copy of the current software package—step 614B; transmitting of a response signal—step 615B to the management server, indicating current status; upon receive of the transmission response from the remote portable power unit—step 615B, the management server continues with a restart command transmitted to the remote portable power unit—step 617B; resulting with a restart of the device'step 618B. Accordingly, when the portable power unit restarts, the new software package may be executed to complete the installation process—step 619B; upon completion, the portable power unit may send an indication message to the management server—step 620B, notifying that the new version of the software for the specific outlet unit is updated. This communication is then received by the management console—step 621B.

Optionally, the backup copy defined in step 614B may refer to the "golden version", where the "golden version" is the version which is flashed in case of long (>30 [sec]) press on the reset button.

It may be noted that the various portable power units may own different software versions, depending on the device type and its operability.

It is also noted, that having an update policy installed on the remote wireless power outlet is essential for answering business matters.

Figure 7A:
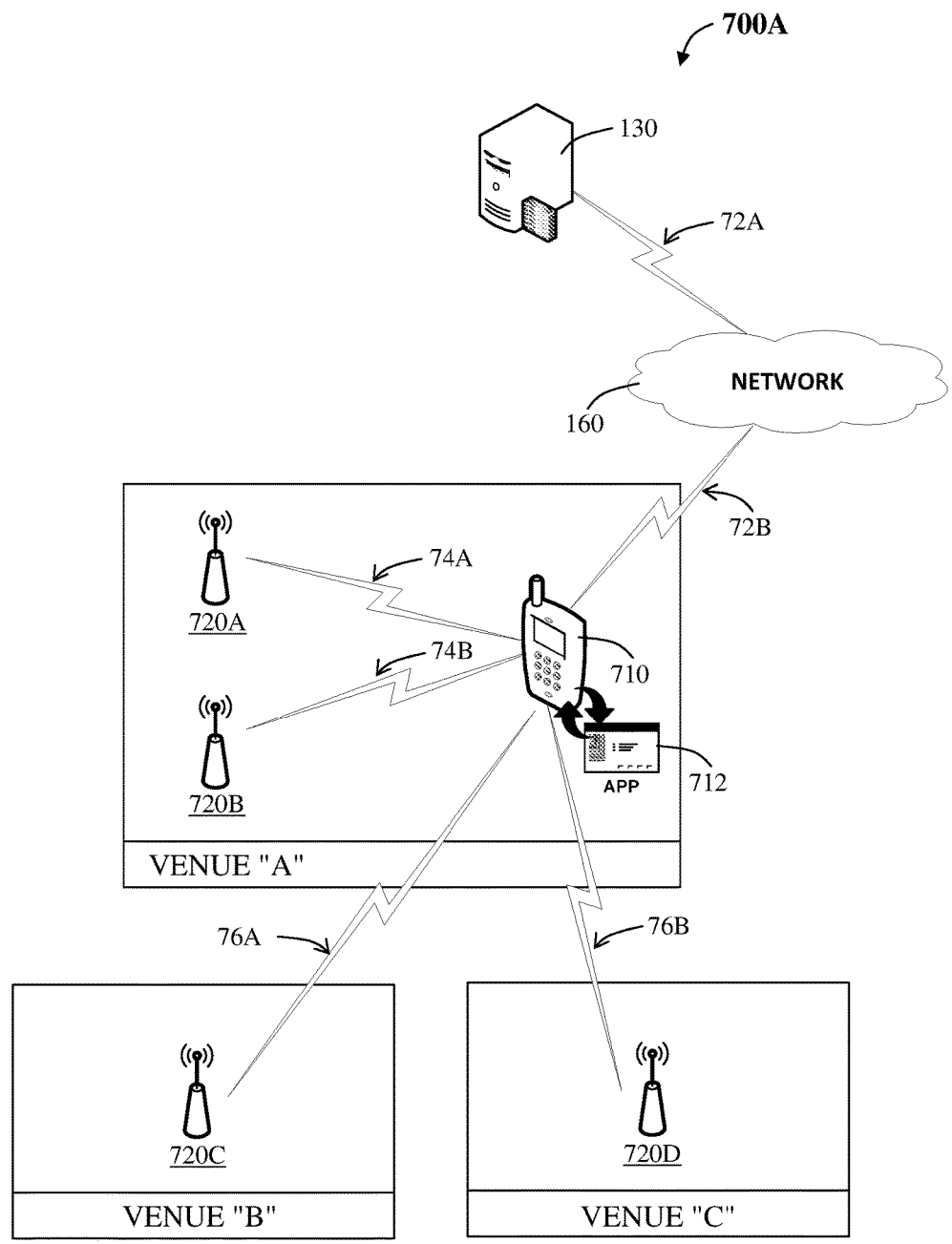
FIG. 7A is a schematic representation of a possible configuration of a wireless powering system for managing wireless power transfer and further operable to provide location services for locating a desired wireless power outlet, according to the presently disclosed subject matter.

Reference is now made to FIG. 7A, there is provided a representation of one possible configuration of selected elements of a wireless powering system, which is generally indicated at 700A, for managing and controlling wireless power transfer and further operable to provide location services for locating a desired wireless power outlet. The system is further operable to provide a distinct outlet location within a venue having a common venue location. The wireless powering system 700A comprises a portable electronic device 710 associated with a user present in a first venue—Venue "A", where the venue is associated with two dedicated wireless transmitters, referred to as a "homing-beacon", each directly attached (or fully integrated) to a wireless power outlet (not shown), a first homing-beacon 720A and a second homing-beacon 720B. The portable electronic device 710 is operable to detect the presence of a homing-beacon using a pre-installed software application 712 configured to detect and communicate with the first homing-beacon 720A via channel 74A and further communicate with the second homing-beacon 720B via the channel 74B. Optionally, "time sharing" of the Bluetooth protocol may allow various other implementations including Bluetooth mesh, pairing with plurality of devices simultaneously and the like.

Additionally, the electronic device 710 may be operable to detect and communicate with homing-beacons in other venues, such as the third homing-beacon 720C associated with Venue "B" via the channel 76A and the fourth homing-beacon 720D associated with Venue "C" via the channel 76B.

Figure 7B:
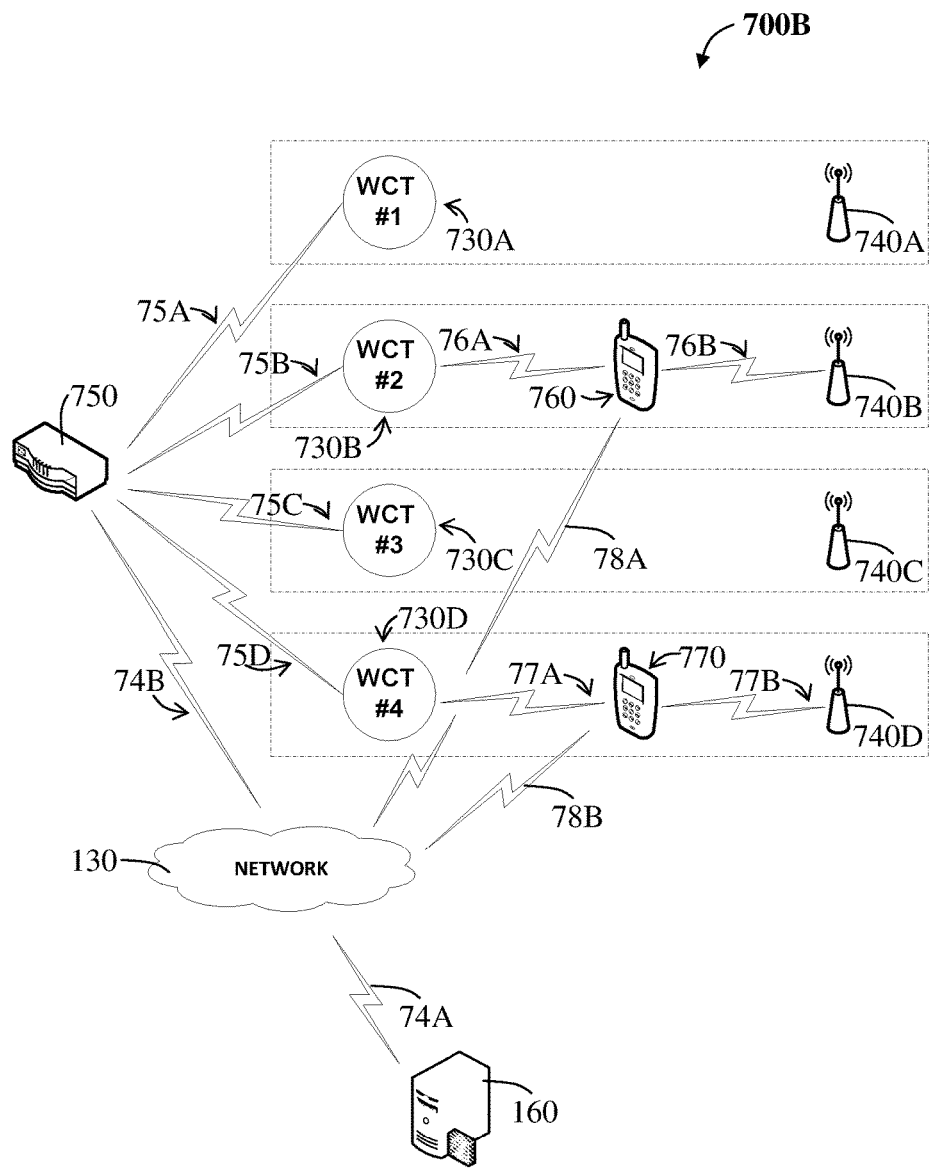
FIG. 7B is a schematic representation of another possible configuration of a wireless powering system for managing wireless power transfer and further operable to provide location services for locating a desired wireless power outlet.

As appropriate, the beacon may transmit a pre-defined unique homing signal configured to allow detection of a wireless charging enabled venue, such as Venue "A", "B" and "C" and further may enable accurate detection of a specific wireless power outlet, which may also be referred to as a wireless charging transmitter (WCT)—see FIG. 7B, within a venue.

The detection of the homing signal may be performed by a software application operable to execute on a mobile electrical device such as a smartphone, a tablet, a laptop and the like configured to communicate with a central server. Accordingly, each wireless power outlet may be configured to pair with a local venue beacon which may be integrated into the wireless outlet or attached to the outlet at any stage post installation. The server may use a database with data pertaining to the wireless outlet configuration, and specifically regarding the association of a local beacon with a wireless outlet based upon the unique local beacon homing signal.

It is noted that the homing-beacon of the wireless power providing system may use technologies such as Near Field Communication (NFC), Radio-Frequency Identification (RFID), Bluetooth Low Energy (BLE), iBeacon, Wi-Fi and Global Positioning System (GPS) and the like.

Reference is now made to FIG. 7B, there is provided a representation of another possible configuration of selected elements of a powering system, which is generally indicated at 700B, for managing and controlling wireless power transfer and further operable to provide location services for locating a desired wireless power outlet. The system is further operable to provide a distinct outlet location within a venue having a common venue location. The wireless powering system 700B is representing a venue comprising a first wireless power outlet 730A which is operable to communicate using a gateway (GW) 750 via channel 75A, a second wireless power outlet 730B operable to communicate using the gateway 750 via channel 75B, a third wireless power outlet 730C operable to communicate using the gateway 750 via channel 75C and a fourth wireless power outlet 730D operable to communicate using the gateway 750 via channel 75D.

Alternatively, in a "one to one" relation, a single wireless power outlet such as 730A may include the gateway (GW) 750 capabilities and work as a single station against the external network. Such architecture may provide for home units where a single (or few) home charging spots may be connected to the external network and be monitored and controlled. Connecting the home charging spot to Internet of Things (IOT) may also assist in receiving updates, monitoring if and who is charging at home. Each wireless power outlet is associated with an homing-beacon: the homing-beacon 740A is associated with the wireless power outlet 730A, the homing-beacon 740B is associated with the wireless power outlet 730B, the homing-beacon 740C is associated with the wireless power outlet 730C and the homing-beacon 740D is associated with the wireless power outlet 730D.

Within the venue, currently two users are illustrated each using a mobile device. A first user using a mobile device 760 may be installable with a dedicated software application (not shown) in communication with the homing device 740B via channel 76B and further in communication with the wireless power outlet 730B via channel 76A. Additionally, a second user using a mobile device 770 may be installable with a dedicated software application (not shown) in communication with the homing device 740D via channel 77B and further in communication with the wireless power outlet 730D via channel 77A.

The gateway 750 is configured to communicate with a network 130 such as the Internet, via a communication channel 74B. Further, the remote central management machine 160 is operable to communicate with the network 130 via channel 74A, thus providing central wireless powering management and location service functionality.

It is noted that each electrical device is open to communicate with the network 130, such as the Internet, thus operable to use a dedicated software application configured to communicate with the central server 160 and consume location services of the system.

Figure 8A:
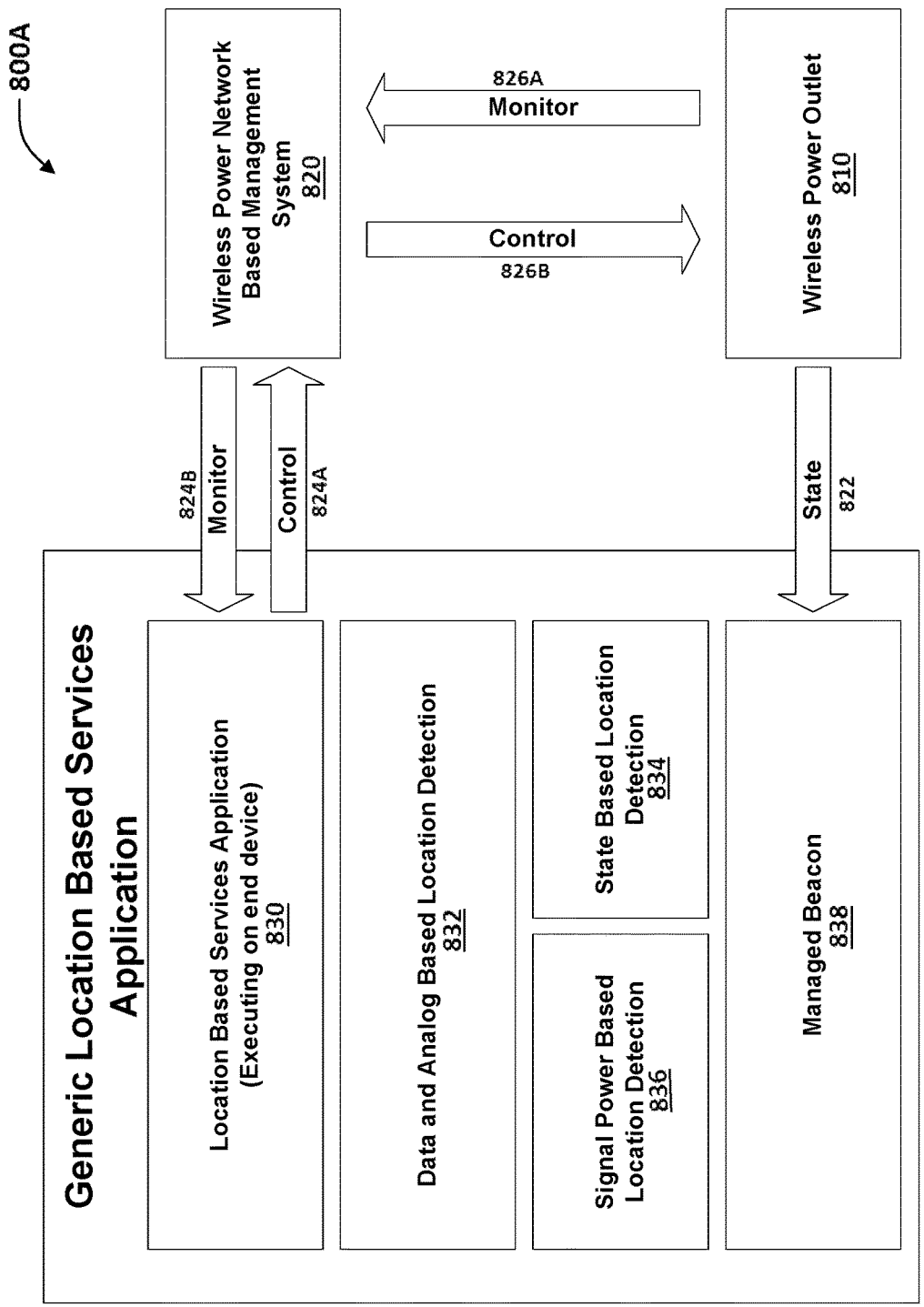
FIG. 8A is a schematic representation of a location based wireless power services platform for providing location functionality using a dedicated software application, according to the presently disclosed subject matter.

Reference is now made to FIG. 8A, there is provided a representation of the location based wireless power services platform, which is generally indicated at 800A, for providing location functionality of a wireless power outlet upon execution of a dedicated software application on the device, potentially requiring wireless power transfer.

The location based wireless power services platform 800A is associated with at least one wireless power outlet 810 positioned in a venue and controlled via a wireless power management system 820 and further with a user electrical device operable to provide location based services by an associated module 830 and further usage of a dedicated software application. The wireless powering management system 820 is operable to monitor the wireless power outlet 810 via a monitoring channel 826A and transmit control signals to manage the outlet via a control channel 826B. The wireless power outlet 810 may be in different states, as described in the state machine diagram of FIG. 10A, and provides its current state to the managed homing-beacon module 838, via a state channel 822.

The electrical device associated software application 830 may be operable to provide location services based upon Wi-Fi, Global Positioning System (GPS), Near Field Communication (NFC) and the like as built in functionality of the electrical device.

The data and analog based location detection 832 may be operable to provide a measurement method combining data and event based detection and further add signal measurement based detection.

As appropriate, the platform may use signal power based for location detection using signal measurements as a filtering tool, removing wireless power outlets out of interest. Such wireless power outlets may be those that the signal measurements indicate that the homing-beacon is too close, too far or unstable beacons, due to movement, for example. Further, the software application may use the broadcasted signal properties in order to calibrate and normalize the analog measurement results.

As appropriate, the platform may use state based location detection. The dedicated software application may use signal measurement in order to handle ambiguity between different wireless power outlets (entity services) with similar states.

As appropriate, the platform may use the managed homing-beacon 838 for location detection. The entity that provides the service (the specific wireless power outlet), controls the content of the homing-beacon signal transmission framework by sending its current state of service to a managed homing-beacon transmitter. The managed homing-beacon repeatedly transmits at constant or regular intervals a homing-signal (at dynamic and controlled power level) reflecting the state of the local service. Further, in order to enable detailed service state report of the service entity, there may be more than one pending/ready/not ready states associated with a wireless power outlet.

Furthermore, the dedicated software application may trigger scanning for homing-beacons and, may respond as follows:
  Optionally, idle state, ignoring homing-beacons which are in "not pending" state or "not ready to provide service" state
  Optionally, homing-beacons which are in "not pending" state or "not ready to provide service" state
  Optionally, detecting "pending and ready for service" state of local entities and identify their unique ID
  The detection application may send the detection results to a remote management system in order to control the service entity and receive location, service state based services and content.

Figure 9A:
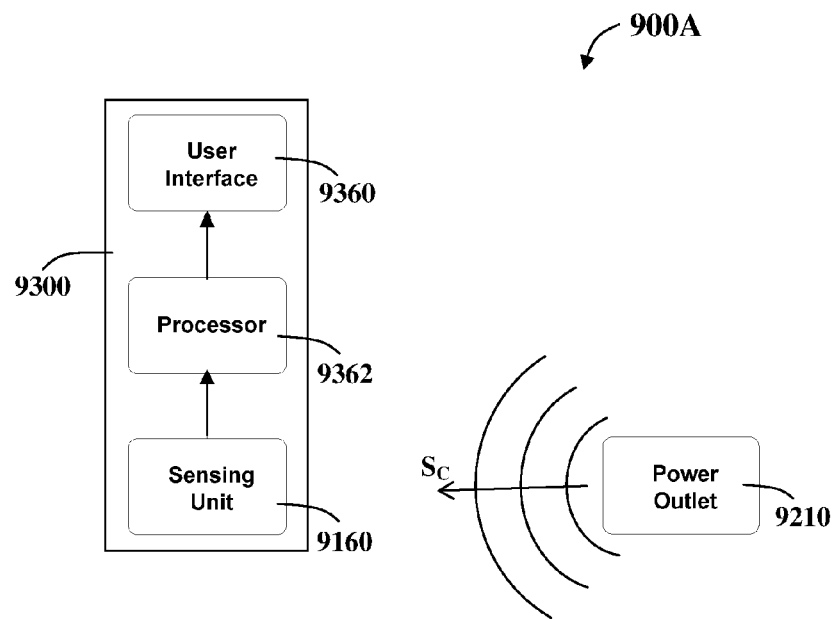
FIG. 9A is a block diagram representing the main features of a wireless power outlet locator, according to the presently disclosed subject matter.

Reference is now made to FIG. 9A, there is provided a block diagram representing the main functional components of a wireless power locating mechanism, which is generally indicated at 900A.

The wireless power locating mechanism includes the wireless power outlet itself 9210 and an associated power outlet locator 9300. The power outlet locator 9300 comprising a sensing unit 9160 configured and operable to detect the wireless power outlet 9210 is provided. A processor 9362, in communication with the sensing unit 9160, is configured to compute the location of the power outlet 9210. A user interface 9360 is provided for communicating the computed location to a user.

According to various embodiments, the sensor unit 9160 may incorporate magnetic sensors such as Hall probes, for example, configured to detect the magnetic field generated by the wireless power outlet directly. Alternatively, the sensor unit 9160 may incorporate a radio receiver for receiving a radio signal transmitted from the wireless power outlet. It will be appreciated, however, that appropriate sensors may be selected for detecting specific electromagnetic wavelengths, including ultra-violet radiation, micro waves, radio waves or even x-ray or shorter wavelengths. Furthermore, the sensing unit may be configured to receive other types of radiation, including mechanical vibrations such as both audible and inaudible (e.g. ultrasonic) sound waves.

Figure 9B:
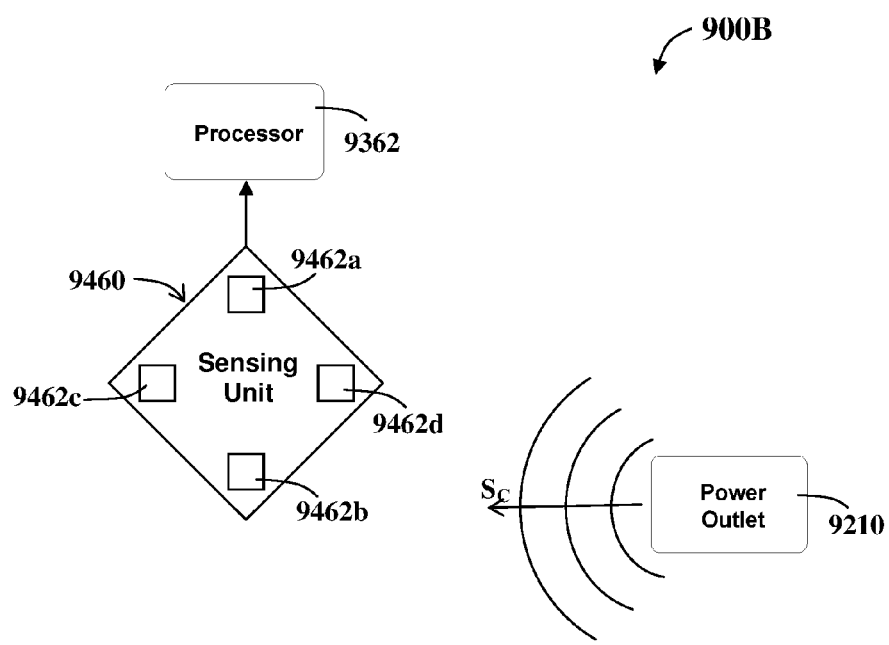
FIG. 9B is a schematic representation of a possible wireless power outlet locator with four sensors, according to the presently disclosed subject matter.

Reference is now made to FIG. 9B, there is provided a block diagram representing the functional components of a sensing unit, which is generally indicated at 900B.

It is noted that the block diagram 900B is showing by way of example, an exemplary sensing unit 9460 using four sensors 9462*a-d*, such as proximity sensors based on volume sensors, infra-red sensors, ultrasonic sensors, magnetic sensors (like Hall probes), inductance sensors, capacitance sensors or the like, are arranged in a diamond configuration.

Each sensor 9462 is configured to receive a control signal $S_C$ transmitted from a wireless power outlet 9210. The processor 9362 may compare the intensity I of the control signal $S_C$ detected by a sensor 9462 with a reference value $I_r$ to indicate the distance between the sensor 9462 and the wireless power outlet 9210.

Furthermore, the diamond configuration, provides two perpendicular opposing pairs of sensors 9462*a-b*, 9462*c-d*. The intensity I of the control signal $S_C$ is measured by each sensor independently. The processor 9460 may use the differences between intensities measured by opposing pairs $(I_a-I_b)$, $(I_c-I_d)$ to provide vector coordinates indicating the direction of the power outlet 9210. Although a two dimensional vector is computed using the two dimensional diamond configuration of sensors described hereinabove, it will be appreciated that a three dimensional vector may be computed from three pairs of sensors in a tetrahedral configuration.

It will be appreciated that the computation method herein described are by way of example, for illustrative purposes only. Alternative methods by which the processor may compute the direction of the power outlet will be familiar to those skilled in the art.

It is noted that a digital bit-rate modulated control signal $S_C$ may be used. Alternatively, the control signal $S_C$ may alternatively be modulated in other ways such as by analogue or digital frequency modulation or by amplitude modulation, for example.

Figure 10A:
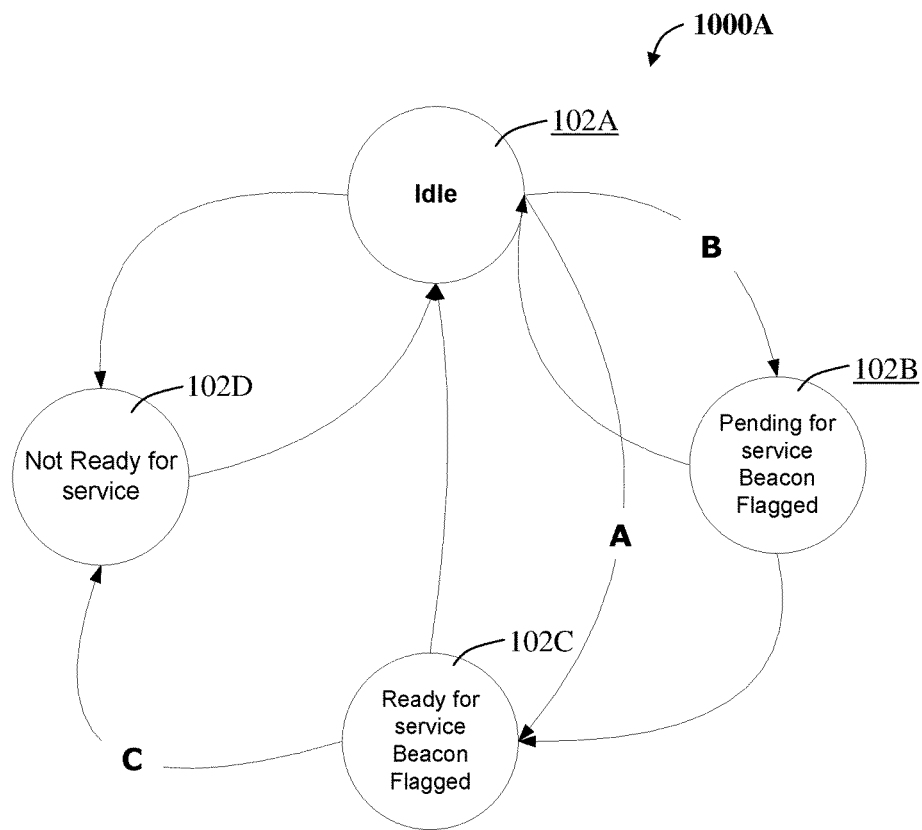
FIG. 10A is a schematic representation of a state machine diagram representing selected possible states of a wireless power outlet, according to the presently disclosed subject matter.

Reference is now made to FIG. 10A, there is provided an exemplified state machine diagram representing selected states of a wireless power outlet, which is generally indicated at 1000A. The exemplified state machine diagram 1000A, may also be referred to as a state diagram, or state-chart diagram, provides an illustration of the states of a wireless power outlet as well as the transitions between those states indicated by curved lined arrows.

The exemplified state diagram 1000A comprises an initial state of "Idle"—102A, a "Pending for Service" state—102B, a "Ready for Service" state—102C and a "Not-Ready for Service" state. Transition is possible from every one state to another state, as indicated by the curved line arrows. For example, the wireless power outlet may move from an "Idle" state 102A to a "Ready for Service" state 102C as indicated by the lined arrow A or to a "Pending for Service" state 102B as indicated by the lined arrow B, and become operational or change state from a "Ready for Service" state 102C to a "Not-Ready for Service" state 102D as indicated by the lined arrow C.

It is noted that each pending/ready or not ready state may consist of detailed multiple sub-states. It is further noted that transiting from one state to another state is triggered by the service entity itself—the wireless power outlet.

It is further noted that the exemplified state machine diagram 1000A is presented by way of example in a non-limiting manner and other state machine diagram are possible.

Figure 10B:
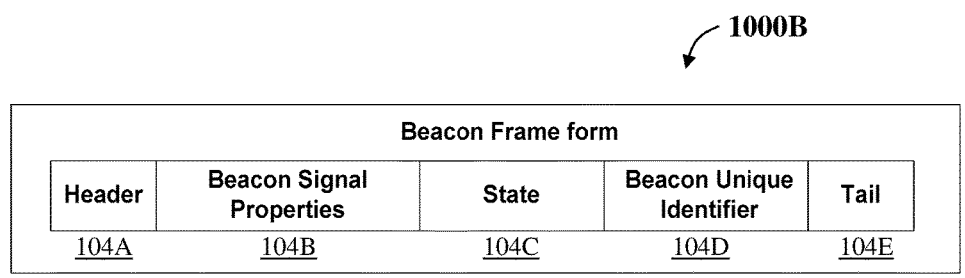
FIG. 10B is a schematic representation of a homing signal communication structure comprising various fields of information communicated between a homing-beacon device and a management server machine, according to the presently disclosed subject matter.

Reference is now made to FIG. 10B, there is provided a homing signal structure, which is generally indicated at 1000B. The homing signal structure 1000B, may include various fields to convey the necessary information between the homing-beacon device and a management server machine, for example.

The homing signal structure 1000B may include a header 104A, a beacon signal properties field 104B comprising associated signal properties, a state field 104C comprising the current associated state of the wireless power outlet, a beacon unique identifier 104D to authorize communication, and a tail 104E.

Figure 11A:
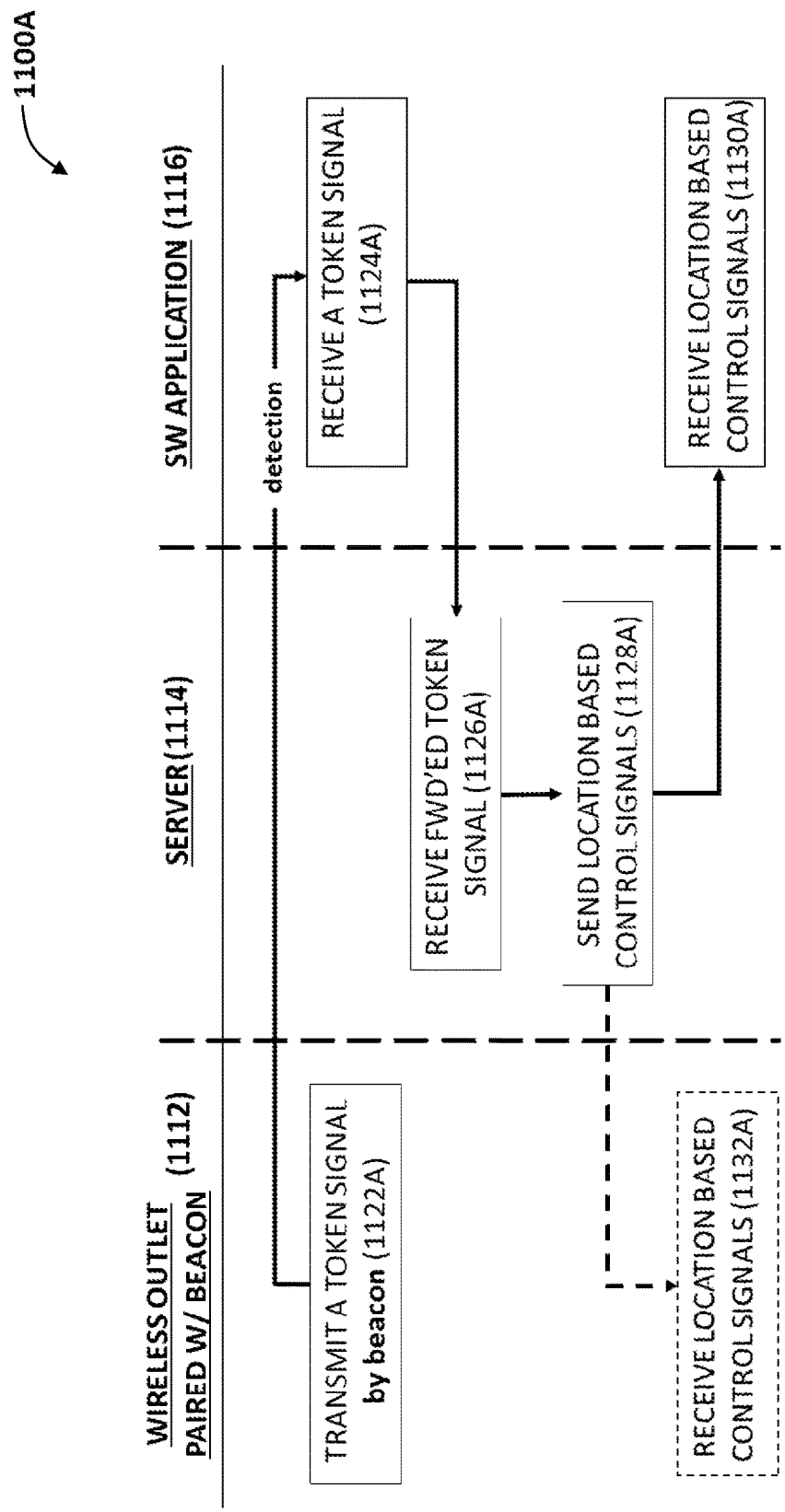
FIG. 11A is a flowchart representing selected actions illustrating a possible method for providing micro-location services for a wireless power outlet, according to the presently disclosed subject matter.

Reference is now made to FIG. 11A, there is provided a flowchart representing selected actions illustrating a possible method, which is generally indicated at 1100A, for providing micro-location services for wireless power transmitters using a system comprising a homing-beacon attached/embedded with a wireless power outlet 1112, a central server 1114 and a software application 1116 associated with an electrical device having a wireless power receiver.

As appropriate, the homing-beacon (a dedicated wireless transmitter) associated with a specific wireless power transmitter is operable to transmit a pre-defined unique homing signal which may allow accurate detection of the wireless power enabled venue—step 1122A; and further, detection of a specific wireless power transmitter, thus the transmitted homing signal may be detectable via a software application associated with the wireless power receiver—step 1124A; sending the received homing signal by the software application to the server—step 1126A, which manages a database of homing signals and their corresponding pre-installed wireless power transmitter; sending, by the server, precision location based controls, media or request for specific status or information—step 1128A; receiving, by the software application, based on the unique homing signal, a precision location based controls, media or request for specific status or information transmitted by the server—step 1130A; optionally, receiving, a precision location based controls, media or request for specific status or information by the wireless power transmitter—step 1132A.

It is noted that the beacon is attached to a specific wireless power transmitter. Optionally, the beacon is integrated into the wireless power transmitter.

Figure 11B:
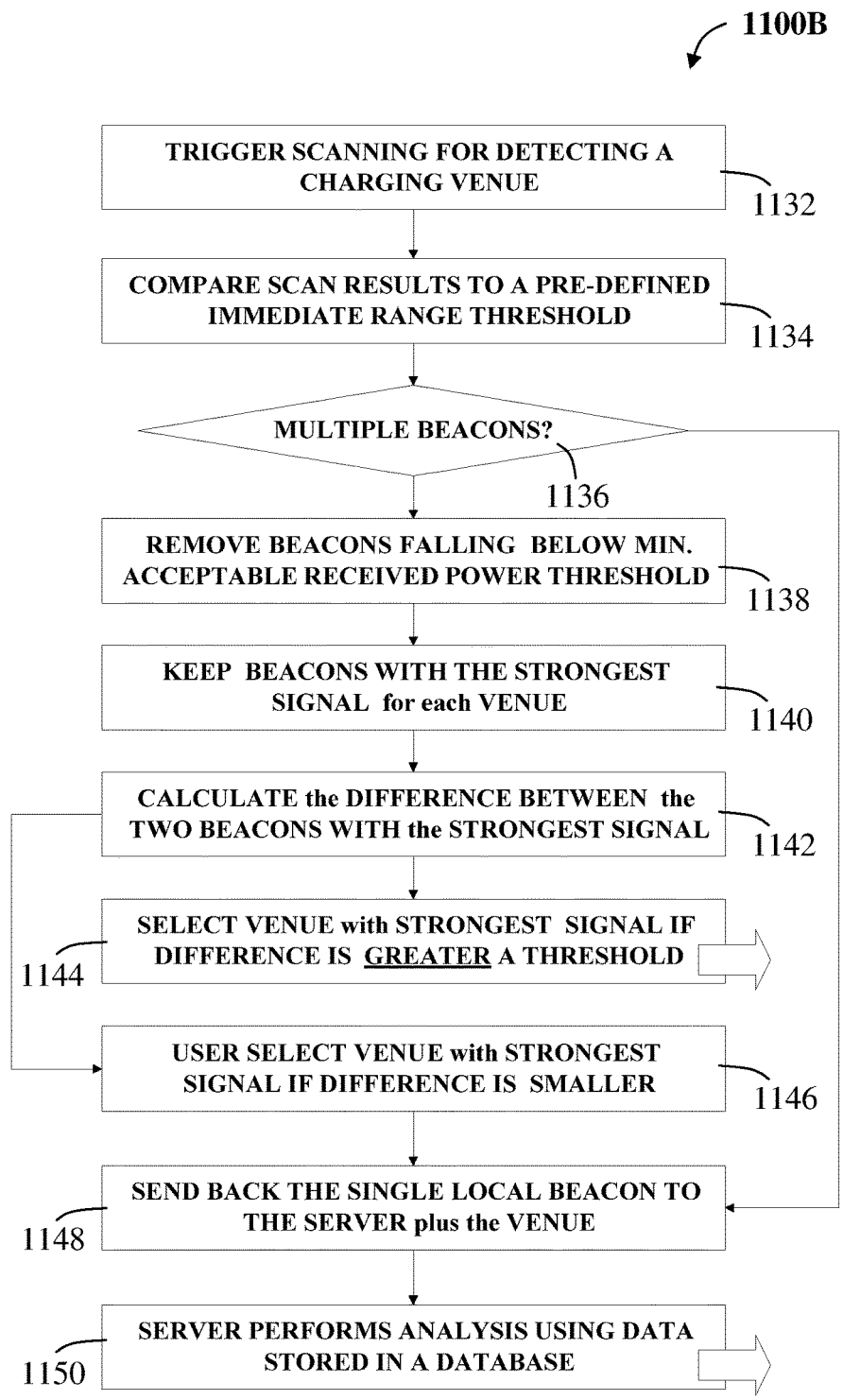
FIG. 11B is a flowchart representing selected actions illustrating a possible method for detecting the precise location and orientation of a device within a venue and detecting a nearby venue or a charging spot within a venue, according to the presently disclosed subject matter.

Reference is now made to FIG. 11B, there is provided a flowchart representing selected actions illustrating a possible method, which is generally indicated at 1100B, for detecting a for detecting the precise location and orientation of a charging spot within a venue and detecting a nearby venue or a charging spot within a venue in order to charge the electrical device.

The detection of a venue may start by triggering a scan for immediate location of existing local beacons, by the software application—step 1132, where the triggering may performed automatically or manually by user; comparing the scan results to a pre-defined immediate range threshold—step 1134; and checking if the scan results indicates the presentence of multiple local beacons—step 1136 in various different venues; then the following algorithm may be used in order to remove ambiguity and determine the detected venue, by removing all beacons which fall below a minimum acceptable received power threshold—step 1138; keeping, for each venue, only the local beacons with the strongest signal—step 1140; calculating the difference between the two beacons with the strongest signal within a venue—step 1142; and selecting the venue of the strongest signal—step 1144, if the difference is greater than a pre-defined significant difference or greater than a user selected (or overridden) threshold from the software application, and further defining the corresponding as the current location with no ambiguity; otherwise, difference is smaller than a pre-defined significant difference, selecting, by the user, the venue with the local beacon with the strongest signal—step 1146.

Accordingly, following step 1136, if the scan results indicate the presence of a single local beacon, then the software application may send the single local beacon homing signal with the reason for triggering the scanning and the detected venue—step 1148, for further analysis by the server machine. It is noted that server analysis may use a pre-installed database in order to decide which corresponding single wireless power transmitter is approached by the electrical device executing the software application.

It is further noted that the server may use the deterministic detection information in order to:
  Manage the specific wireless power transmitter (such as enabling/disabling the device)
  Cross information of trigger reason with the status of the wireless power transmitter (such as waiting for state change to power transfer enabled and the like)
  Verification of the beginning of an active wireless power transfer for the specific device on a specific wireless power transmitter as a trigger to data transfer to the software application (for example a coupon) or a 3rd party software application (like payment)

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims.

Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

It is claimed:

1. A wireless power providing system configured to transfer wireless power to at least one electrical device associated with a wireless power receiver, the system comprising:
   at least one venue having at least one outlet that is operable to transfer power to the device via the receiver;
   at least one homing-beacon, each at least one homing-beacon being coupled with one associated outlet, wherein the at least one homing-beacon is operable to provide location based services of the at least one outlet and at least one venue with which it is associated;
   at least one management server operable to manage wireless power transfer from the at least one outlet to the at least one device; and
   a software application installed in the device configured to communicate between the device and components selected from a group consisting of the at least one management server, the at least one homing-beacon, the at least one outlet, and any combination thereof,
   wherein the at least one management server utilizes the communication between the device and the components to manage wireless power transfer of the at least one outlet of the at least one venue.

2. The wireless power providing system of claim 1, wherein said at least one management server is further operable to execute instructions directed to receiving a first identification code associated with each outlet.

3. The wireless power providing system of claim 1, wherein said at least one management server is further operable to execute instructions directed to receiving a second identification code from the software application and providing using data based on said location based services stored in an associated data repository.

4. The wireless power providing system of claim 1, wherein the homing-beacon uses a technology selected from the group consisting of Near Field Communication (NFC), Radio-Frequency Identification (RFID), Bluetooth Low Energy, iBeacon, Wi-Fi, Global Positioning System (GPS), and any combination thereof.

5. The wireless power providing system of claim 1, wherein the homing-beacon is operable to transmit a unique homing signal detectable by the software application and further to communicate with said at least one management server.

6. The wireless power providing system of claim 5, which further comprises analyzing said unique homing signal using the system's data repository to provide location based services identified by comparing signal strength of associated wireless power outlets.

7. The wireless power providing system of claim 5, wherein each said homing-beacon is characterized by one structural element selected from the group consisting of the homing-beacon coupled with the associated outlet and the homing-beacon embedded into the outlet.

8. The wireless power providing system of claim 1, wherein the at least one management server is further operable to execute instructions directed to monitoring health of the at least one outlet and providing remote maintenance of the at least one outlet.

9. The wireless power providing system of claim 2, wherein the at least one management server is further operable to manage wireless power transfer to each outlet based on policy associated with each outlet, wherein the policy determines power transfer conditions for each outlet of the at least one outlet.

10. The wireless power providing system of claim 9, wherein the policy is characterized by a default power management policy determining default power transfer conditions.

11. The wireless power providing system of claim 9, wherein the policy is characterized by at least one data functionality selected from the group consisting of:
    data functionality pertaining to location identification;
    data functionality pertaining to orientation of the at least one outlet;
    data functionality pertaining to a user identification;
    data functionality pertaining to a duration of time of wireless power transfer;
    data functionality pertaining to a real time management of power consumption;
    data functionality pertaining to real time management of battery health;
    data functionality pertaining to location traffic control;
    data functionality pertaining to historical usage;
    data functionality pertaining to a level of current applied at power transfer from said at least one outlet and any combination thereof.

12. The wireless power providing system of claim 8, wherein said providing remote maintenance further comprises performing a maintenance action selected from the group consisting of:
    starting each outlet;
    updating firmware of each outlet;
    stopping each outlet;
    restarting each power outlet;
    software updating for each outlet;
    controlling a visual user interface for each outlet; and
    controlling a user audio interface for each outlet; and any combination thereof.

13. The wireless power providing system of claim 8, wherein said monitoring health comprises verifying that the at least one outlet is responding to a communication signal within a time-out limit.

14. The wireless power providing system of claim 9, wherein the policy is distributed in response to a change of the policy on said at least one management server.

15. The wireless power providing system of claim 9, wherein the policy is distributed according to a distribution schedule.

16. The wireless power providing-system of claim 9, wherein the policy is distributed upon a communication request from the at least one outlet.

\* \* \* \* \*